United States Patent
Berg et al.

(10) Patent No.: US 12,421,177 B2
(45) Date of Patent: Sep. 23, 2025

(54) SOLUBILIZING COMPOSITION

(71) Applicant: Oro Agri Inc., Fresno, CA (US)

(72) Inventors: Paulo Sergio Berg, Londrina-Parana (BR); Melvin Donovan Pullen, Burbank, CA (US); Jared Vanderzyl, Clovis, CA (US)

(73) Assignee: Oro Agri Inc., Fresno, CA (US)

( * ) Notice: Subject to any disclaimer, the term of this patent is extended or adjusted under 35 U.S.C. 154(b) by 121 days.

(21) Appl. No.: 17/754,510

(22) PCT Filed: Oct. 12, 2020

(86) PCT No.: PCT/IB2020/059579
§ 371 (c)(1),
(2) Date: Apr. 4, 2022

(87) PCT Pub. No.: WO2021/070163
PCT Pub. Date: Apr. 15, 2021

(65) Prior Publication Data
US 2024/0101495 A1 Mar. 28, 2024

Related U.S. Application Data

(60) Provisional application No. 62/913,660, filed on Oct. 10, 2019.

(51) Int. Cl.
*C05G 3/50* (2020.01)
(52) U.S. Cl.
CPC ...................... *C05G 3/50* (2020.02)

(58) Field of Classification Search
CPC ........................................................ C05G 3/50
See application file for complete search history.

(56) References Cited

U.S. PATENT DOCUMENTS

| | | | |
|---|---|---|---|
| 5,630,861 A | 5/1997 | Yaniv | |
| 6,383,984 B1 | 5/2002 | Aven | |
| 2004/0231575 A1 | 11/2004 | Wilkerson et al. | |
| 2005/0059565 A1 | 3/2005 | Sutton et al. | |
| 2011/0201500 A1 | 8/2011 | Mertoglu et al. | |
| 2012/0282207 A1* | 11/2012 | Lutz ............... | C10M 129/02 510/491 |
| 2016/0347795 A1 | 12/2016 | Li et al. | |
| 2017/0127668 A1 | 5/2017 | Berg et al. | |

(Continued)

FOREIGN PATENT DOCUMENTS

| | | |
|---|---|---|
| CN | 104322552 A | 2/2015 |
| CN | 104411170 A | 3/2015 |

(Continued)

OTHER PUBLICATIONS

Search Report in International Application No. PCT/IB2020/059579 mailed on Apr. 12, 2021.

(Continued)

*Primary Examiner* — Wayne A Langel
(74) *Attorney, Agent, or Firm* — Knobbe, Martens, Olson & Bear, LLP

(57) ABSTRACT

A solubilizing composition that facilitates solubilizing fertilizer compounds and/or fertilizer compositions when in an aqueous solution particularly in an in-furrow application. The solubilizing composition includes a first anionic surfactant and a first and second humectant.

17 Claims, 8 Drawing Sheets

(56) References Cited

U.S. PATENT DOCUMENTS

| | | | |
|---|---|---|---|
| 2017/0327840 A1 | 11/2017 | Kijlstra et al. | |
| 2019/0014788 A1* | 1/2019 | Sawant | A01N 65/03 |
| 2019/0150444 A1 | 5/2019 | Liu et al. | |
| 2019/0169118 A1 | 6/2019 | Piorkowski et al. | |
| 2019/0194084 A1 | 6/2019 | Khaleel | |

FOREIGN PATENT DOCUMENTS

| | | |
|---|---|---|
| CN | 106892785 A | 6/2017 |
| CN | 111094541 A | 5/2020 |
| IL | 110241 A | 10/1998 |
| WO | WO-2016195978 A1 * | 12/2016 |

OTHER PUBLICATIONS

International Preliminary Report on Patentablilty in International Application No. PCT/IB2020/059579 mailed on Oct. 19, 2021.

* cited by examiner

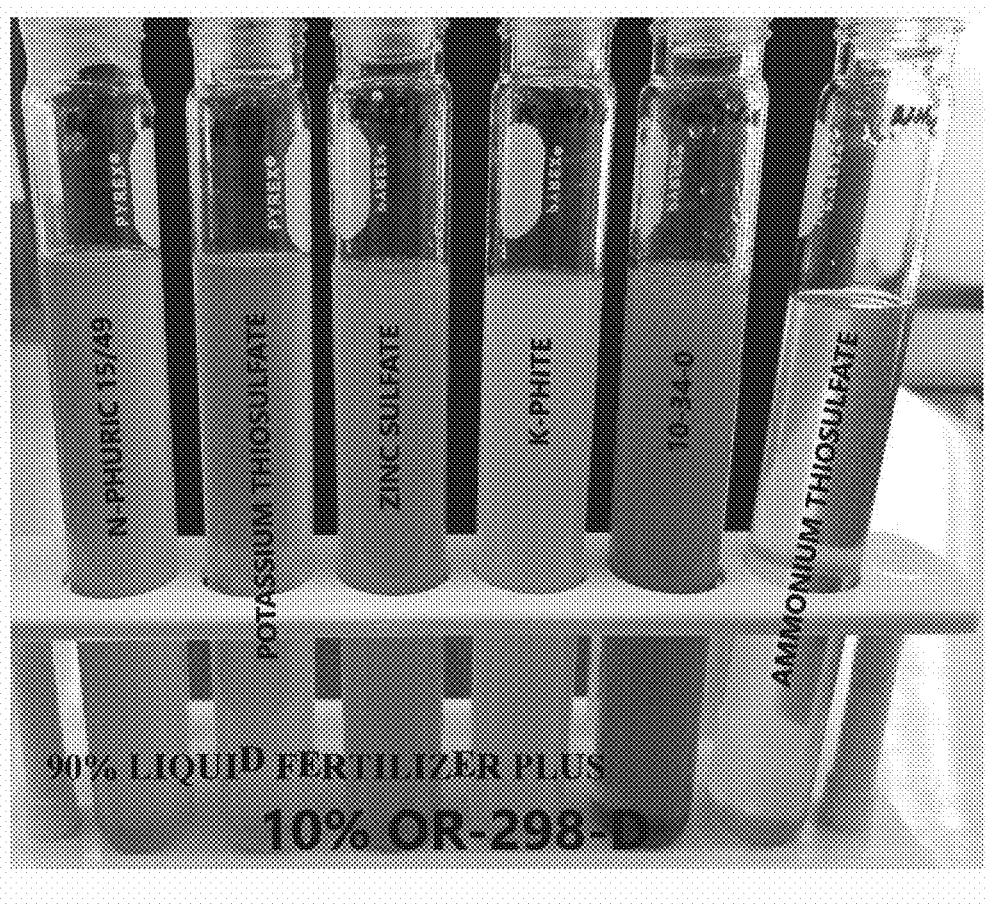
FIGURE 1 A-F

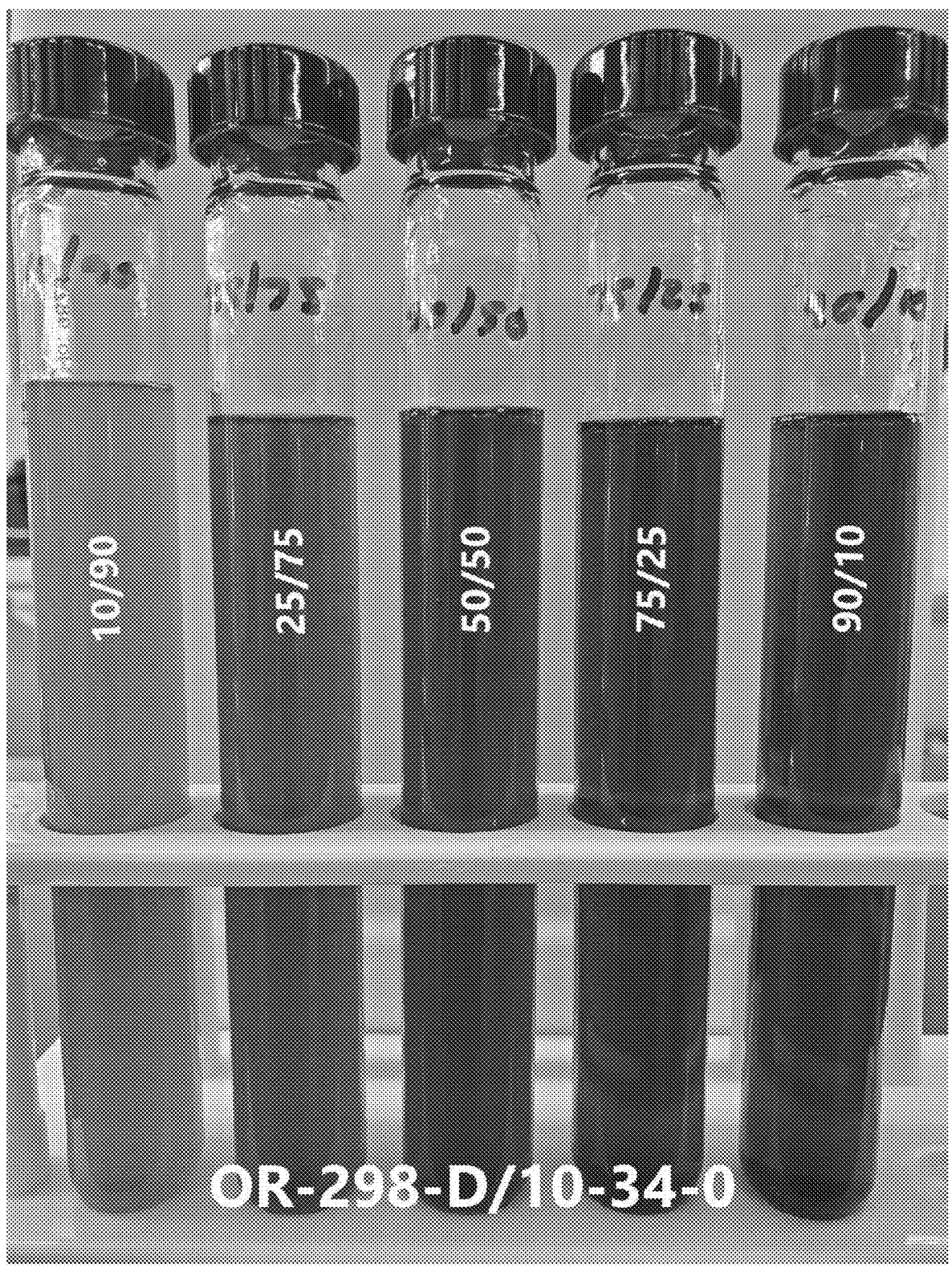
(A)　　(B)　　(C)　　(D)　　(E)
FIGURE 2 A-E

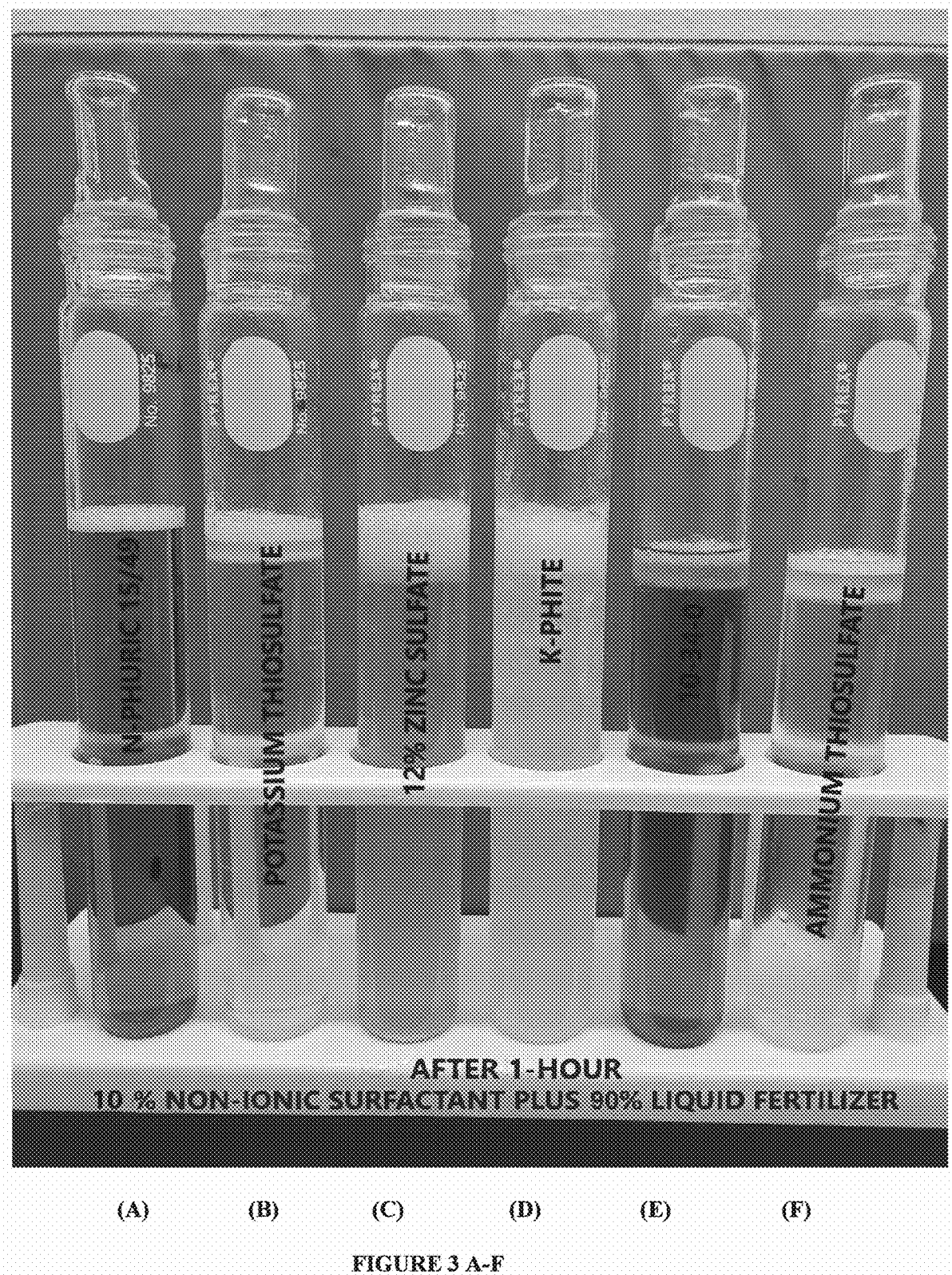
FIGURE 3 A-F

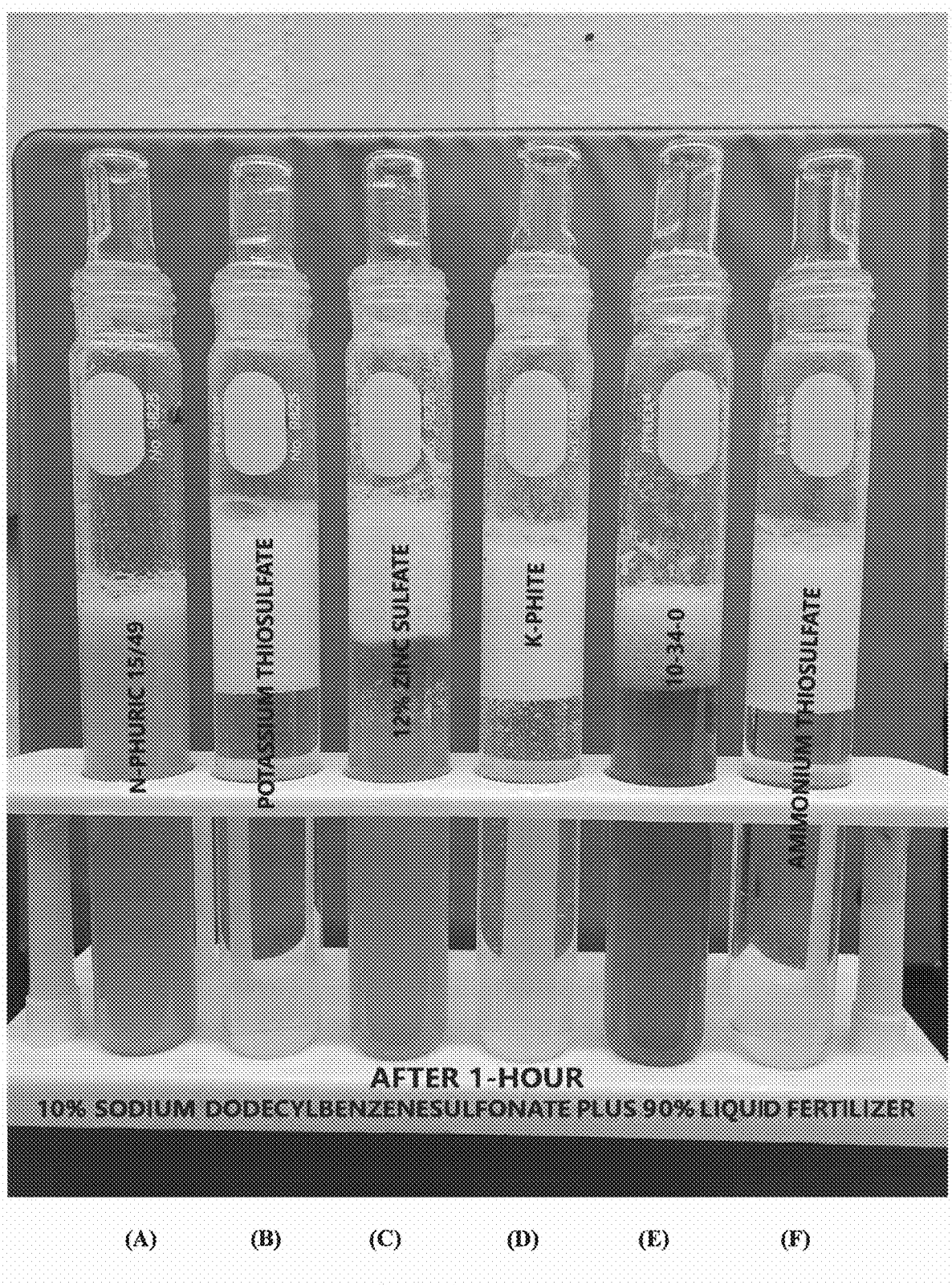
FIGURE 4 A-F

SOLUBILIZING COMPOSITION

This application is a U.S. National Phase under 35 U.S.C. § 371 of International Application PCT/IB2020/059579, filed Oct. 12, 2020, designating the United States, and published in English as WO 2021/070163 on Apr. 15, 2021, which claims priority to U.S. Provisional Application No. 62/913,660, filed Oct. 10, 2019, the entire content of each of which is incorporated herein by reference.

FIELD OF THE INVENTION

This disclosure relates to a solubilizing composition. The solubilizing composition of this disclosure facilitates solubilizing fertilizer compounds and/or fertilizer compositions. Particularly, this disclosure relates to a solubilizing composition comprising a first anionic surfactant, and at least one first humectant. Preferably, the solubilizing composition further includes at least one second humectant. The first humectant is typically a polyol humectant and the second humectant is typically an alkyl(poly)glycoside. The solubilizing composition may further include a solvent such as water. The disclosure extends to a method of solubilizing fertilizer compounds and/or fertilizer compositions, particularly potassium (K) and/or phosphorous (P) containing fertilizer compounds and/or fertilizer compositions.

BACKGROUND OF THE INVENTION

Many phosphorous (P) and potassium (K) containing fertilizers are known. Typically, it is desirous to solubilize fertilizers in a tank mix before irrigating and/or fertigating crops.

Phosphorous (P), typically in the form of phosphates, and potassium (K) containing fertilizers are known to have low solubility when in a tank mix prior to being dispersed in an agricultural application via irrigation or fertigation. The low solubility is applicable in dilute and concentrated tank mixes, but highly prevalent in concentrated tank mixes. It is not uncommon for certain fertilizer compounds to precipitate out of solution and/or to form a gel, which precipitate or gel hinders dispersing of tank mixed fertilizers, in use, by clogging irrigation reticulation systems. It is desired to solubilize fertilizer compounds and/or fertilizer compositions to provide a stable solubilized tank mix. In agricultural applications, it is desirous to concentrate phosphorous (P) and potassium (K) containing liquid fertilizers in application tanks on planter vehicles to reduce the need for refilling the tanks during planting, and also to reduce aqueous diluent weight on the vehicle in order to minimize compaction. P and K are then applied in highly concentrated forms but cannot disperse into the soil given the lack of dilution. A farmer will then rely or irrigation, rain or smelting of snow to disperse the liquid phosphorous (P) and potassium (K) containing fertilizers on the soil. This creates uncertainty and is ineffective.

Further, surfactants are often desired to be applied to crops for a plethora of well-established reasons. Surfactants are typically employed in agriculture to reduce surface tension of water by reducing hydrogen bonding, which in turn facilitates spreading of water over soil and through pores of soil.

Anionic surfactants are affordable and function well to wet dry soil that has become hydrophobic over time. Soil often becomes hydrophobic over a time period of reduced precipitation. Conventionally, these anionic surfactants work effectively as soil wetting agents owing to its negatively charged portion.

However, it is well established that anionic surfactants cause certain fertilizer compounds, for example potassium (K) and phosphorous (P) containing fertilizers (particularly when concentrated), to precipitate out of solution and/or form a gel making it very difficult to admix anionic surfactants together with the liquid fertilizer concentrate. This necessitates additional spray applications utilizing more water, time and equipment, and increases compaction. Although significantly diluting anionic surfactants may hinder precipitation of fertilizer compounds, this requires excess water and therefore several rounds of application and increased soil compaction which is not desired. Anionic surfactants are not to be admixed with P and/or K fertilizer concentrate solutions since precipitation of fertilizer compounds is common, therein clogging reticulation and/or fertigation systems.

A known way to facilitate fertilizer solubility is through the use of some nonionic surfactants replacing anionic surfactants, although some nonionic surfactants also show incompatibility with fertilizers (for example alcohol ethoxylated surfactants often cause an salting out effect when admixed with fertilizers due to the cations binding with the ether oxygen of ethylene oxide and dehydrating the nonionic surfactant). Advancements in nonionic surfactants include the use of block co-polymers such as ethylene oxide propylene oxide (EO/PO) block co-polymers. Although often ameliorating the precipitation problem, nonionic surfactants are expensive and are not as effective in wetting hydrophobic soils when compared to anionic surfactants, specifically after drought or a long dry season. There remains a need to provide both P and/or K fertilizers in concentrated tank mixes (to avoid unnecessary soil compaction and/or reduce water usage), and there remains a need to provide anionic surfactant(s), to a crop, seed or soil in agricultural endeavors. There remains a need to provide a new and innovative solubilizing composition that will at least ameliorate one of the disadvantages known in the prior art or described herein above.

SUMMARY OF THE INVENTION

Broadly, there is provided a solubilizing composition for a fertilizer compound and/or fertilizer composition, the solubilizing composition including:
  a first anionic surfactant comprising an aryl or alkyl sulfonic acid, and/or a derivative thereof; and
  at least one humectant selected from, but not limited to, the group comprising: glycerol or alkyl ethers thereof, propylene glycol, polypropylene glycol or alkyl ethers thereof, sorbitol, mannitol, dulcitol and/or polyols, straight chain ($C_4$-$C_{18}$) alkyl(poly)glycosides, branched chain ($C_4$-$C_{18}$) alkyl(poly)glycosides, straight chain ($C_4$-$C_{18}$) alkyl(poly)glucosides, branched chain ($C_4$-$C_{18}$) alkyl(poly)glucosides, aryl glycosides and/or derivatives thereof,
  such that in use in a tank mix including a fertilizer compound and/or fertilizer composition, the solubilizing composition facilitates solubilizing the fertilizer compound and/or the fertilizer composition in the tank mix therein facilitating application and/or fertigation to a crop.

In accordance with a first aspect of this disclosure there is provided a solubilizing composition for a fertilizer compound and/or fertilizer composition, the solubilizing composition including:

a first anionic surfactant comprising an aryl or alkyl sulfonic acid, and/or a derivative thereof;

at least one first humectant selected from, but not limited to, the group comprising: propylene glycol, polypropylene glycol, glycerol, sorbitol, mannitol, dulcitol and/or polyols thereof, at least one second humectant selected from, but not limited to, the group comprising: alkyl glycoside, aryl glucoside, straight chain ($C_4$-$C_{18}$) alkyl(poly)glycosides, branched chain ($C_4$-$C_{18}$) alkyl(poly)glycosides, straight chain ($C_4$-$C_{18}$) alkyl(poly)glucosides, branched chain ($C_4$-$C_{18}$) alkyl(poly)glucosides, and/or derivatives thereof, such that in use in a tank mix including a fertilizer compound and/or fertilizer composition, the solubilizing composition facilitates solubilizing the fertilizer compound and/or the fertilizer composition in the tank mix therein facilitating application and/or fertigation to a crop.

The Applicant is surprised that the solubilizing composition comprising the first anionic surfactant and the at least one humectant (preferably further including an at least second humectant) provides for enhanced solubility of fertilizer compounds and/or fertilizer compositions. The Applicant is further surprised that the solubilizing composition according to the disclosure enhances solubility of phosphorous (P) and potassium (K) containing fertilizer compounds and/or fertilizer compositions (including concentrated P and K and/or liquid fertilizers) by hindering precipitation and/or gelation. Further surprising is that the solubilizing composition of this disclosure unexpectedly provides a means for providing an anionic surfactant to soil, seed or crops in need thereof. The solubilizing composition of this disclosure reduces the amount of water required to solubilize fertilizer, reduces the number of fertigation applications, minimizes soil compaction, but concomitantly allows for application of anionic surfactant to soils enhancing hydrophilicity of hydrophobic soils therein further reducing the amount of water required to sufficiently irrigate a crop. The anionic surfactant may now also provide adjuvant characteristics advantageous to a seed, plant, soil or crop.

The fertilizer compound and/or fertilizer composition may further include an aqueous or non-aqueous based first solvent inside a tank providing a tank mix prior to application and/or fertigation to a crop. Typically, the application and/or fertigation may be via in-furrow means. The solubilizing composition may also include water in varying amounts, and the solubilizing composition may be provided as a concentrate or a diluted form. Typically, the commercial embodiment available to a customer is the concentrate form. The concentrate form may be added to the tank mix, when in use by the customer (for example a farmer), to provide a dilute form inside the tank mix. To reduce compaction of soil and to reduce water usage the customer (for example a farmer) may utilize the solubilizing composition together with concentrated fertilizer compounds and/or concentrated fertilizer compositions. The concentrate form solubilizing composition and the dilute form solubilizing composition may each be liquid.

The solubilizing composition, preferably the concentrate form of the solubilizing composition, may further comprise a pH adjusting means (an acid or base). The pH adjusting means may be a base. The base may be at least one of, but not limited to, the following group: sodium hydroxide, potassium hydroxide, calcium hydroxide, magnesium hydroxide, ammonium hydroxide, ethanolamine, monoethanolamine, diethanolamine, and triethanolamine. The pH adjusting means (when being a base) may neutralize the first surfactant to provide an anionic salt. In use, when the concentrated form of the solubilizing composition is added to the tank mix to provide the dilute form, the anionic salt dissociates into the first anionic surfactant and a counterion.

The solubilizing composition, preferably the concentrate form of the solubilizing composition, may further comprise an additive selected from, but not limited to, the group comprising: preservatives, clarifiers, anti-freezing agents, hydrotropes, stabilizers, antioxidants, acidifiers (acid pH adjusters), neutralizers (base or acid pH adjusters), chelates, complexing agents, dyes, rheology modifiers, antifoams, anti-drift, organic solvents, oils, and combinations thereof.

The preservative may further comprise a compound selected from, but not limited to, the group comprising: isothiazolinones derivatives, benzisothiazolinones (BIT), methylisothiazolinones (MIT), chloromethylisothiazolinones (CIT or CMIT), octylisothiazolinones (OIT), dichloro-octyl-isothiazolinones (DCOIT), 2-bromo-2-nitropropane-1, 3-diol (Bronopol), dibromo-nitrilopropion Amide (DBNPA), imidazolinones, hydroxymethyl-dimethylimidazolidone-dione, formaldehydes, paraformaldehydes, formaldehydes donors, hydroxymethyl ureide formaldehydes donors, parabens, methylparaben, propylparaben, ortho phenylphenol, dimethyloxazolidine, bromo-nitro-dioxane, 2,4-dichlorobenzyl alcohol, chloro-dichlorophenoxy-phenol, imidazolidinyl urea, 2-phenoxyethanol, benzyl-chlorophenol, phenoxy-propan-ol, cetyl pyridinium bromide and chloride, sodium hydroxymethylglycinate, benzethonium chloride, benzalkonium chloride, bromide and saccharinate, and/or combinations thereof.

The antifoam may further comprise a compound selected from, but not limited to, the group comprising: organomodified siloxane polymers, polyethersiloxane polymers, polyorganosiloxanes polymers, polydimethylsiloxanes polymers, fluorosilicones polymers, modified silicon based polymers, siloxanepolyoxyalkylene block copolymer, polyether functional silicon copolymers, polyester functional silicone copolymers, polyoxyalkylene-polysiloxane copolymers, polysiloxane-polyoxyethylene-polyoxypropylene triblock copolymers, silicon methacrylate compounds, polyglycerol partial esters of fatty acids, polyglycerol partial esters of aromatic acids, fatty alcohol and fatty alcohol ethoxylated based compounds, and/or combinations thereof.

The oil may be a natural or synthetic compound, may be a terpene or terpene containing natural oil, may be a natural oil modified by esterification or transesterification, such as an alkyl fatty acid ester, e.g., methyl esters, ethyl esters, propyl esters, butyl esters, 2-ethylhexyl esters or dodecyl esters, and is preferably a fatty acid, such as ($C_{10}$-$C_{22}$) fatty acid esters, such as from vegetables oils, preferably oil-yielding plants species such as citrus, soybean, corn, sunflower, rapeseed oil, cottonseed oil, linseed oil, palm oil, safflower, coconut oil, castor oil, olive oil, canola oil among others pure or mixed with an essential or edible oil extracted from a variety of plants or parts of plants such as trees, shrubs, leaves, flowers, grasses, fluids, herbs, fruits and seeds, or mixed with each other that are combined with one or more oils. The oil may be a terpene containing natural oil. In a certain embodiment of the disclosure the oil is a citrus oil, and may particularly be orange oil.

The solubilizing composition, preferably the concentrate form of the solubilizing composition, may further comprise at least one second anionic surfactant selected from, but not limited to, the group comprising ammonium lauryl sulfate, sodium lauryl sarcosinate, sodium myreth sulfate, sodium pareth sulfate, sodium stearate, α-olefin sulfonate, and sodium lauryl ether sulfate (SLES) or derivatives thereof, ($C_6$-$C_{18}$) alkyl benzene sulfonic acid salts, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, lignosulfonates, lignosulfonates salts, lignosulfonic acid sulfomethylated sodium, calcium, magnesium or potassium salts, sarcosines and sarcosinates salts, succinates salts, sulfosuccinates salts, tall oil fatty acids salts, alkyl fatty acids salts, vegetal oil fatty acid salts, lanolin fatty acid salts and combinations thereof.

The solubilizing composition, preferably the concentrate form of the solubilizing composition, may further comprise a nonionic surfactant which may be selected from, but not limited to, the group comprising: natural and/or synthetic ($C_8$-$C_{22}$) alkoxylated fatty alcohols, ($C_8$-$C_{22}$) ethoxylated fatty alcohols, alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof. The Applicant is surprised that the solubilizing composition according to this disclosure facilitates compatibility of nonionic surfactants with phosphorous (P) and potassium (K) containing fertilizer compounds and/or fertilizer compositions (including concentrated P and K and/or liquid fertilizers) by increasing solubility and/or hindering precipitation and/or gelation.

The ethoxylated fatty alcohols of fatty acids may have a degree of ethoxylation of from 1 to 50, more preferably 2 to 30, most preferably 3 to 20.

Some alkoxylated alcohols contemplated for use include those based on branched alcohols, such as the Guerbet alcohols, e.g. 2-propylheptanol and 2-ethylhexanol, and $C_{10}$—OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals.

In a preferred embodiment of the disclosure, the first anionic surfactant may comprise an aryl or alkyl sulfonic acid, or a derivative thereof, and may be a ($C_{10}$-$C_{18}$) alkyl benzenesulfonic acid or derivative thereof. The alkyl group may be linear or branched, saturated or unsaturated, modified or unmodified. In a certain preferred embodiment of this disclosure the first anionic surfactant maybe a linear dodecylbenzenesulfonic acid.

In certain embodiments of the solubilizing composition the first anionic surfactant may be present in an amount of between about 0.1 wt. % to about 30 wt. %, preferably in an amount of between about 0.1 wt. % to about 20 wt. %, further preferably in an amount of between about 0.1 wt. % to about 15 wt. %, and most preferably in an amount of about 2 wt. % to about 12 wt. %. of the concentrate form of the solubilizing composition.

In certain embodiments of the solubilizing composition the at least one first humectant is a polyol humectant which may be present in an amount of between about 5 wt. % to about 65 wt. %, preferably between about 25 wt. % to about 60 wt. %, further preferably between about 30 wt. % to about 55 wt. % of the concentrate form of the solubilizing composition.

In certain embodiments of the solubilizing composition the at least one second humectant is a alkyl(poly)glycoside humectant which may be present in an amount of between about 5 wt. % to about 55 wt. %, preferably between about 10 wt. % to about 50 wt. %, further preferably between about 15 wt. % to about 35 wt. % of the concentrate form of the solubilizing composition.

In a certain embodiment of the solubilizing composition water may be present in an amount of between about 5 wt. % to about 70 wt. %, preferably between about 10 wt. % to about 60 wt. %, further preferably between about 15 wt. % to about 50 wt. % of the concentrate form of the solubilizing composition.

In a certain embodiment of the solubilizing composition the pH adjusting means may be present in an amount of between about 0.1 wt. % to about 10 wt. %, preferably between about 0.5 wt. % to about 5 wt. %, further preferably between about 1 wt. % to about 3 wt. % of the concentrate form of the solubilizing composition.

In a certain embodiment of the solubilizing composition the preservative may be present in an amount of between about 0.05 wt. % to about 5 wt. %, preferably between about 0.08 wt. % to about 2 wt. %, further preferably between about 0.1 wt. % to about 1 wt. % of the concentrate form of the solubilizing composition.

In a certain embodiment of the solubilizing composition the antifoam may be present in an amount of between about 0.05 wt. % to about 5 wt. %, preferably between about 0.08 wt. % to about 2 wt. %, further preferably between about 0.1 wt. % to about 1 wt. % of the concentrate form of the solubilizing composition.

In certain embodiments of the solubilizing composition the second anionic surfactant may be present in an amount of between about 1 wt. % to about 20 wt. %, preferably between about 2 wt. % to about 10 wt. %, further preferably between about 3 wt. % to about 6 wt. % of the concentrate form of the solubilizing composition.

In certain embodiments of the solubilizing composition the nonionic surfactant may be present in an amount of between about 0.5 wt. % to about 20 wt. %, preferably between about 1 wt. % to about 10 wt. %, further preferably between about 2 wt. % to about 5 wt. % of the concentrate form of the solubilizing composition.

The concentrate form of the solubilizing composition may be stable and does not undergo phase separation.

In a certain example embodiment of the disclosure the concentrate form of the solubilizing composition comprises:
    a first anionic surfactant comprising an aryl and/or alkyl sulfonic acid, or a derivative thereof, wherein the first anionic may be an alkyl sulfonic acid preferably may be a ($C_{10}$-$C_{18}$) alkyl benzenesulfonic acid or derivative thereof, wherein the alkyl group may be linear or branched, saturated or unsaturated, modified or unmodified, preferably in a certain preferred embodiment of this disclosure the first anionic surfactant may be a linear dodecyl benzenesulfonic acid, and wherein the first anionic surfactant may be present in an amount of between about 0.1 wt. % to about 30 wt. %, preferably in an amount of between about 0.1 wt. % to about 20 wt. %, further preferably in an amount of between about 0.1 wt. % to about 15 wt. %, and most preferably in an amount of about 2 wt. % to about 12 wt. %. of the concentrate form of the solubilizing composition;

a first humectant selected from, but not limited to, the group comprising: propylene glycol, polypropylene glycol, glycerol, sorbitol, mannitol, dulcitol, or polyols thereof, and wherein the humectant may be present in an amount of between about 5 wt. % to about 65 wt. %, preferably between about 25 wt. % to about 60 wt. %, further preferably between about 30 wt. % to about 55 wt. % of the concentrate form of the solubilizing composition a second humectant selected from, but not limited to, the group comprising: alkyl glycoside, alkyl glucoside, straight chain ($C_4$-$C_{18}$) alkyl(poly)glycoside, branched chain ($C_4$-$C_{18}$) alkyl(poly)glycoside, straight chain ($C_4$-$C_{18}$) alkyl(poly)glucosides, branched chain ($C_4$-$C_{18}$) alkyl(poly)glucosides, and/or derivatives thereof, and wherein the humectant may be present in an amount of between about 5 wt. % to about 55 wt. %, preferably between about 10 wt. % to about 50 wt. %, further preferably between about 15 wt. % to about 35 wt. % of the concentrate form of the solubilizing composition;

a solvent which may be water, and wherein the solvent may be present in an amount of between about 5 wt. % to about 70 wt. %, preferably between about 10 wt. % to about 60 wt. %, further preferably between about 15 wt. % to about 50 wt. % of the concentrate form of the solubilizing composition;

a pH adjusting means which may be a base, preferably sodium hydroxide, and wherein the base may be present in an amount of between about 0.1 wt. % to about 10 wt. %, preferably between about 0.5 wt. % to about 5 wt. %, further preferably between about 1 wt. % to about 3 wt. % of the concentrate form of the solubilizing composition;

optionally a preservative which may be an isothiazolinone based compound or composition, and wherein the preservative may be present in an amount of between about 0.05 wt. % to about 5 wt. %, preferably between about 0.08 wt. % to about 2 wt. %, further preferably between about 0.1 wt. % to about 1 wt. % of the concentrate form of the solubilizing composition; and optionally an antifoam which may be an organo-modified siloxane based compound or composition, and wherein the antifoam may be present in an amount of between about 0.05 wt. % to about 5 wt. %, preferably between about 0.08 wt. % to about 2 wt. %, further preferably between about 0.1 wt. % to about 1 wt. % of the concentrate form of the solubilizing composition.

The example embodiment may further comprise a second anionic surfactant and may be present in an amount of between about 1 wt. % to about 20 wt. %, preferably between about 2 wt. % to about 10 wt. %, further preferably between about 3 wt. % to about 6 wt. % of the concentrate form of the solubilizing composition.

The Applicant has surprisingly found that the subject matter of the disclosure herein ameliorates the disadvantages in the prior art.

In a certain example embodiment of the disclosure the concentrate form of the solubilizing composition comprises:

a first anionic surfactant comprising a ($C_{10}$-$C_{18}$) alkyl benzenesulfonic acid or derivative thereof, present in an amount of between about 2 wt. % to about 12 wt. %. of the concentrate form of the solubilizing composition;

a first humectant selected from the group consisting of: propylene glycol, polypropylene glycol, glycerol, sorbitol, mannitol, dulcitol or polyols thereof, and wherein the humectant present in an amount of between about 30 wt. % to about 55 wt. % of the concentrate form of the solubilizing composition;

a second humectant selected from the group consisting of: alkyl glycoside, alkyl glucoside, straight chain ($C_4$-$C_{18}$) alkyl(poly)glycoside, branched chain ($C_4$-$C_{18}$) alkyl(poly)glycoside, straight chain ($C_4$-$C_{18}$) alkyl(poly)glucoside, branched chain ($C_4$-$C_{18}$) alkyl(poly)glucoside, and/or derivatives thereof, and wherein the humectant present in an amount of between about 15 wt. % to about 35 wt. % of the concentrate form of the solubilizing composition;

a solvent which is water, and wherein water present in an amount of between about 15 wt. % to about 50 wt. % of the concentrate form of the solubilizing composition;

a pH adjusting means which is a base, preferably sodium hydroxide, and wherein the base present in an amount of between about 1 wt. % to about 3 wt. % of the concentrate form of the solubilizing composition;

a preservative which is an isothiazolinone based, and present in an amount of between about 0.1 wt. % to about 1 wt. % of the concentrate form of the solubilizing composition; and an antifoam which is an organo-modified siloxane based, and present in an amount of between about 0.1 wt. % to about 1 wt. % of the concentrate form of the solubilizing composition.

The example embodiment may further comprise a second anionic surfactant may be sodium lauryl ether sulfate (SLES) or derivatives thereof and may be present in an amount of between about 3 wt. % to about 6 wt. % of the concentrate form of the solubilizing composition.

The concentrate form of the solubilizing composition may be diluted in a tank mix or irrigation system and mixed an aqueous fertilizer and/or other chemistries at a rate of 1:5000 to 1:10, such that in use inside the tank mix the solubilizing composition facilitates the fertilizer to remain in solution and prevents components of the fertilizer to precipitate out of solution, therein aiding the application and/or fertigation of the aqueous fertilizer to crops via in-furrow application, side-dress application, topdress application, band application, seedling placement application. The solubilizing composition according to this disclosure facilitates providing fertilizer compounds and/or fertilizer compositions into soil to a seed and/or plant for uptake and/or incorporation into said seed and/or plant which will increase rate of growth and/or plant biomass and/or crop yield.

The other chemistries may include, but not limited to, the group comprising: insecticides, fungicides, acaricides, nutrients, miticides, bactericides, biocides, ovicides, nematicides, insect growth regulators, plant grow regulators, and biostimulants.

Additionally and/or alternatively, the concentrate form of the solubilizing composition diluted to form the diluted form and applied to crops concomitantly provides anionic surfactant to the crops and aids the retention of water and/or aids the uptake of fertilizer by the crop. Further additionally and/or alternatively the concentrated form of the solubilizing composition according to this disclosure may be tank mixed with concentrated phosphorous (P) and potassium (K) containing fertilizer compounds and/or fertilizer compositions (including concentrated P and K and/or liquid fertilizers) to avoid unnecessary soil compaction and/or to save water usage, wherein the solubilizing composition is compatible with the concentrated phosphorous (P) and potassium (K) containing fertilizer compounds and/or fertilizer compositions.

In accordance with a second aspect of this disclosure there is provided a method of diluting a concentrate form of the solubilizing composition according to the first aspect of this disclosure, the method comprising:

diluting the concentrate solubilizing composition according to the first aspect of the disclosure above with water (or by adding to a water containing fertilizer composition) at a ratio by weight of concentrate solubilizing composition to water (or water containing fertilizer composition) from about 1:5000 to about 1:5 to yield a diluted form of the solubilizing composition, preferably within a tank mix, and preferably together with an aqueous fertilizer compound and/or fertilizer composition and/or other chemistries. The diluted solubilizing composition may be stable and does not undergo phase separation.

The fertilizer compound and/or fertilizer composition may preferably include phosphorous (P) and/or potassium (K). The fertilizer compound and/or fertilizer composition may be in a concentrate form, or alternatively, in a dilute form.

In accordance with a third aspect of this disclosure there is provided a method of solubilizing a fertilizer compound and/or fertilizer composition in an aqueous based solvent, preferably inside a tank mix prior to in-furrow application and/or fertigation of a crop, the method comprises the steps of:

adding the solubilizing composition according to the first aspect of this to the fertilizer compound and/or fertilizer composition, to provide a solubilized solution for in-furrow application and/or fertigation to a crop; and optionally adding water or another solvent.

The in-furrow application and/or fertigation may be onto, or adjacent to, a plant or seed.

The application and/or fertigation may be via in-furrow application, side-dress application, top-dress application, band application, seedling placement application. The method extends to a method of in-furrow fertigation using the composition of the first aspect of this disclosure.

In accordance with a fourth aspect of this disclosure there is provided a method of fertigation comprising adding the solubilizing composition of the first aspect into a tank mix including a fertilizer compound and/or fertilizing composition and fertigating a crop, seed, or plant via in-furrow application, side-dress application, top-dress application, band application, seedling placement application, such that in use the solubilizing composition prevents coagulation and/or precipitation inside the tank mix and/or fertigation reticulation network whilst concomitantly allowing for the application of anionic surfactant to a dry soil. There is further provided for a solubilizing composition and/or a method substantially as herein described, illustrated and/or exemplified with reference to any one or more of the examples and/or figures.

BRIEF DESCRIPTION OF THE FIGURES

Embodiments of the disclosure will be described below by way of example only and with reference to the accompanying drawings in which:

FIG. 1(A) to (F) shows the solubilizing composition according to the first aspect of this disclosure, particularly the preferred embodiment ORO-298-D, in use solubilizing several different commercially available fertilizers (A) to (F) at 10% ORO-298-D and 90% commercial fertilizer.

FIG. 2(A) to (E) shows the solubilizing composition according the first aspect of this disclosure, particularly the preferred embodiment ORO-298-D, in use in different concentrations together with a liquid ammoniated phosphate 10-34-0 (commercially available).

FIG. 3(A) to (F) shows solubility and miscibility of fertilizers with non-ionic adjuvant based on 20% of alcohol ethoxylated wherein FIG. 3A shows 90% fertilizer (N-Phuric) and 10% non-ionic surfactant; FIG. 3B shows 90% fertilizer (potassium thiosulfate) and 10% non-ionic surfactant; FIG. 3C shows 90% fertilizer (zinc sulfate) and non-ionic surfactant;

FIG. 3D shows 90% fertilizer (K-Phite) and 10% non-ionic surfactant; and FIG. 3E shows 90% fertilizer (10-34-0) and 10% non-ionic surfactant; and FIG. 3F shows 90% fertilizer (ammonium thiosulfate) and 10% non-ionic surfactant.

FIG. 4(A) to (F) shows solubility and miscibility of fertilizers with anionic surfactant based on 20% of sodium dodecylbenzene sulfonate wherein FIG. 4A shows 90% fertilizer (N-Phuric) and 10% anionic surfactant; FIG. 4B shows 90% fertilizer (potassium thiosulfate) and 10% anionic surfactant; FIG. 4C shows 90% fertilizer (zinc sulfate) and 10% anionic surfactant; FIG. 4D shows 90% fertilizer (K-Phite) and 10% anionic surfactant; and FIG. 4E shows 90% fertilizer (10-34-0) and 10% anionic surfactant; and FIG. 4F shows 90% fertilizer (ammonium thiosulfate) and 10% anionic surfactant.

DETAILED DESCRIPTION

Figure 5A:
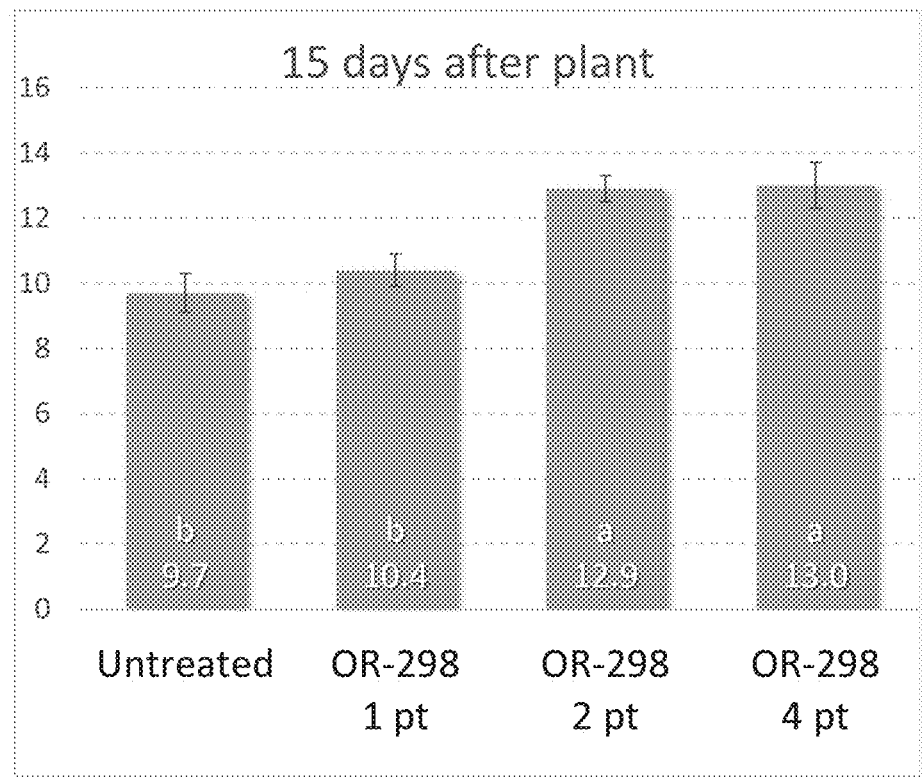
FIG. 5A show the effect of ORO-298 in furrow application on the germination of soybeans at 15 days after planting. All rates per acre. Error bars: Standard error ($p<0.05$). ORO-298 effects observed with or without fertilizer in furrow. 2.5 gal/ac using 6-24-6 fertilizer. In furrow treatment at seed. 5 gal/ac mixture volume. Soil: Milford silty clay loam. pH 6.8. Application of ORO-298 shows improved early germination.

The content of the Summary is repeated herein by way of reference thereto to avoid repetition. Generally, in a preferred embodiment, there is provided a solubilizing composition comprising an anionic surfactant and two humectants (a first humectant and a second humectant), and wherein the solubilizing composition is stable. In use the solubilizing composition solubilizes aqueous and/or liquid fertilizer compounds and/or fertilizer compositions each containing at least phosphorous (P) and/or potassium (K). In a certain embodiment of the disclosure, the solubilizer composition further includes a pH adjusting means and/or a solvent and/or a nonionic surfactant and/or additives. The subject matter of this disclosure is particularly useful and/or advantageous for in furrow applications when in use, since the subject matter of this disclosure hinders gelation and/or coagulation which would otherwise block irrigation/fertigation systems and/or cause fertilizers to precipitate out in the tank and fail to reach its intended target in the field. The solubilizing composition of the disclosure prevents coagulation in a tank mix particularly when added to concentrated P and K fertilizers (having a low aqueous content or a non-aqueous content).

As described herein, it is well established that anionic surfactants cause certain fertilizer compounds, for example potassium (K) and phosphorous (P) containing fertilizers, to precipitate out of solution and/or form a gel making it very difficult to admix anionic surfactants or most common nonionic surfactants together with the fertilizer. This is particularly problematic when the fertilizer is in concentrated form.

The functionality of surfactants and/or humectants are well studied when applied to soils and/or crops although a great deal of the mechanisms of action remain not well understood. However, the prior art does not motivate, suggest or occasion the person skilled in the art to consider a solubilizing composition comprising an anionic surfactant and a humectant to facilitate solubility of aqueous (or non-aqueous) fertilizer compounds and/or fertilizer compositions each containing at least phosphorous (P) and/or potassium (K), and typically in concentrated form. Further, the solubilizing composition according to this disclosure unexpectedly and surprisingly provides for an effective means of delivering anionic surfactant to a soil in need thereof. Anionic surfactants are more effective compared to nonionic surfactants when applied to long dried out soils owing to its negatively charged end.

The Applicant is surprised that the solubilizing composition comprising the first anionic surfactant and the at least two humectants provide for enhanced solubility of fertilizer compounds and/or fertilizer compositions. The Applicant is further surprised that the solubilizing composition according to the disclosure enhances solubility of phosphorous (P) and potassium (K) containing fertilizer compounds and/or fertilizer compositions by hindering precipitation and/or gelation. Further surprising is that the solubilizing composition of this disclosure unexpectedly provides a means for providing an anionic surfactant to soil in need thereof. The solubilizing composition of this disclosure reduces the amount of water required to solubilize fertilizer, reduces the number of fertigation applications (therein avoiding soil compaction), but concomitantly allows for application of anionic surfactant to soils enhancing hydrophilicity of hydrophobic soils therein further reducing the amount of water required to sufficiently irrigate a crop. The anionic surfactant may now also provide adjuvant characteristics advantageous to the seed, plant, soil or crop.

Definitions

The term "adjuvant" as used herein is a broad term, and is to be given its ordinary and customary meaning to a person of ordinary skill in the art (and is not to be limited to a special or customized meaning), and refers without limitation to an agent that modifies the effect of other agents and more particularly used to enhance the effectiveness of pesticides such as herbicides, insecticides, fungicides and other agents including fertilizer compounds and/or fertilizer compositions.

The term "stable" as used herein is a broad term, combined or related with the term "emulsion", and is to be given its ordinary and customary meaning to a person of ordinary skill in the art (and is not to be limited to a special or customized meaning), and refers without limitation to the emulsion stability, i.e. the ability of a solution or an emulsion to resist change in its properties over time, and/or not undergoing phase separation or precipitation of components within solution or in emulsion, and for an emulsion that the size of the droplets in emulsion does not change significantly with time, more specifically during the time of an application to the targets mixed with water, it is thus to be given its ordinary meaning that is customary to a person skilled in the art. The term "stable" as used herein is a broad term, combined or related with the term "accelerated storage stability", means that the formulation keep similar performance in terms of physico-chemical properties after samples be stored during 15 days in at least 3 conditions: room temperature (around 20° C.); cold temperature (0° C. or 5° C.); hot temperature (54° C.). Storage stability tests were conducted according Method of the Collaborative International Pesticide Analytical Council (CIPAC) MT 36.

The term "solvents" as used herein is a broad term, and is to be given its ordinary and customary meaning to a person of ordinary skill in the art (and is not to be limited to a special or customized meaning), and refers without limitation to compounds with some characteristics of solvency for other compounds or means, that can be aqueous, polar or non-polar, linear or branched, cyclic or aliphatic, aromatic, naphthenic and that includes but is no limited to: water, alcohols, amides, esters, diesters, ketones, acetates, terpenes, sulfoxides, glycols, lactates, paraffins, hydrocarbons, anhydrides, heterocyclics, among others.

Whenever a group is described as being "optionally substituted" that group may be unsubstituted or substituted with one or more of the indicated substituents. Likewise, when a group is described as being "unsubstituted or substituted" if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, mercapto, alkylthio, thioalkyl arylthio, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, a mono-substituted amino and a di-substituted amino group, and protected derivatives thereof.

The term "alkyl" as used herein is a broad term, and is to be given its ordinary and customary meaning to a person of ordinary skill in the art (and is not to be limited to a special or customized meaning), and refers without limitation to a straight chain or branched, acyclic or cyclic, unsaturated or saturated aliphatic hydrocarbon containing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more carbon atoms, while the term "lower alkyl" has the same meaning as alkyl but contains 1, 2, 3, 4, 5, or 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl," respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like. Typical alkyl groups include, but are in no way limited to, methyl, ethyl, propyl, isopropyl, butyl, isobutyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, henatriacontyl, dotriacontyl, tritriacontyl, tetratriacontyl, pentatriacontanyl, and hexatriacontanoic. The alkyl group may be substituted or unsubstituted.

The term "alkoxy" as used herein is a broad term, and is to be given its ordinary and customary meaning to a person of ordinary skill in the art (and is not to be limited to a special or customized meaning), and refers without limitation to an alkyl moiety attached through an oxygen bridge (i.e., —O-alkyl) such as methoxy, ethoxy, and the like.

The term "thioalkyl" as used herein is a broad term, and is to be given its ordinary and customary meaning to a person of ordinary skill in the art (and is not to be limited to a special or customized meaning), and refers without limitation to an alkyl moiety attached through a sulfur bridge (i.e., —S-alkyl) such as methylthio, ethylthio, and the like.

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "ester" as used herein is a broad term, and is to be given its ordinary and customary meaning to a person of ordinary skill in the art (and is not to be limited to a special or customized meaning), and refers without limitation to any compound as described herein incorporating one or more ester groups, e.g., monoester, diester, triester, or polyester, or being substituted by or functionalized to include one or more ester groups. Esters include but are not limited to fatty acid esters.

The term "acetates" as used herein is a broad term, and is to be given its ordinary and customary meaning to a person of ordinary skill in the art (and is not to be limited to a special or customized meaning), and refers without limitation to any compound as described herein incorporating one or more acetate groups, such as salts, esters or other compounds incorporating a $CH_3COO$— moiety.

The term "amides" as used herein is a broad term, and is to be given its ordinary and customary meaning to a person of ordinary skill in the art (and is not to be limited to a special or customized meaning), and refers without limita- tion to solvents based on substitutes amides, substitutes alkyl amides, substitutes alkyl carboxylic acid alkyl amides, straight, branched or cyclic amides, and/or combinations thereof.

The term "terpenes" as used herein is a broad term, and is to be given its ordinary and customary meaning to a person of ordinary skill in the art (and is not to be limited to a special or customized meaning), and refers without limitation to any compound as derived from resins of plants such as conifers or citrus, or to synthetically produced compounds having the same structures as plant derived terpenes. Terpenes can include hydrocarbons as well as terpenoids containing additional functional groups, as well as essential oils. Terpenes can include compounds having a formula $(C_5H_8)n$ where n is the number of linked isoprene units (e.g., 1, 2, 3, 4, 5, 6, 7, 8, 9, 10, or more).

The term "terpene containing natural oil" as used herein is a broad term, and is to be given its ordinary and customary meaning to a person of ordinary skill in the art (and is not to be limited to a special or customized meaning), and refers without limitation to a natural oil containing at least 50% of a terpene selected from but not exclusively from the group consisting of orange oil, grapefruit oil, lemon oil, lime oil, tangerine oil, and pine oil or components thereof.

The term "sulfoxides" as used herein is a broad term, and is to be given its ordinary and customary meaning to a person of ordinary skill in the art (and is not to be limited to a special or customized meaning), and refers without limitation to any compound as described herein incorporating one or more sulfinyl (SO) groups, or being substituted by or functionalized to include one or more sulfinyl groups.

The term "glycols" as used herein is a broad term, and is to be given its ordinary and customary meaning to a person of ordinary skill in the art (and is not to be limited to a special or customized meaning), and can include diols, e.g., polyalkylene glycols such as polyethylene glycols (polymers having the formula $H(OCH_2CH_2)_nOH$ where n is greater than three), polypropylene glycols, or glycols incorporating monomers comprising longer hydrocarbon chains.

The term "lactates" as used herein is a broad term, and is to be given its ordinary and customary meaning to a person of ordinary skill in the art (and is not to be limited to a special or customized meaning), and refers without limitation to solvents based on acid lactic substitutes, alkyl lactates, straight or branched alkyl lactates, acid lactic alkyl esters and/or combinations thereof.

The term "paraffins" as used herein is a broad term, and is to be given its ordinary and customary meaning to a person of ordinary skill in the art (and is not to be limited to a special or customized meaning), and refers without limitation to heavier alkanes, such as alkanes forming a liquid or wax at room temperature, as well as functionalized paraffins, e.g., chlorinated paraffins, and mineral or synthetic oils comprising hydrocarbons. Room temperature as used herein refers to ambient conditions, e.g., in a climate controlled building, for example, approximately 20° C.

The term "hydrocarbons" as used herein is a broad term, and is to be given its ordinary and customary meaning to a person of ordinary skill in the art (and is not to be limited to a special or customized meaning), and refers without limitation to any compound comprising only carbon and hydrogen atoms. A functionalized or substituted hydrocarbon has one or more substituents as described elsewhere herein.

The term "anhydrides" as used herein is a broad term, and is to be given its ordinary and customary meaning to a person of ordinary skill in the art (and is not to be limited to a special or customized meaning), and refers without limitation to any compound as described herein incorporating one or more anhydride groups (of formula $(RC(O))_2O$), or being substituted by or functionalized to include one or more anhydride groups.

The term "sulfonic acid" as used herein is a broad term, and is to be given its ordinary and customary meaning to a person of ordinary skill in the art (and is not to be limited to a special or customized meaning), and refers without limitation to, for example, methanesulfonic, ethanesulfonic, p-toluenesulfonic, salicylic or naphthalene sulfonic acid. Sulfonic acids can include hydrocarbyl sulfonic acids, such as aryl sulfonic acids, alkyl benzene sulfonic acid, among other, ($C_{10}$-$C_{18}$) alkyl benzenesulfonic acids or derivative thereof. The alkyl group may be linear or branched, saturated or unsaturated, modified or unmodified. The sulfonic acid may be dodecyl benzenesulfonic acid.

The term "vegetable oil" as used herein is a broad term, and is to be given its ordinary and customary meaning to a person of ordinary skill in the art (and is not to be limited to a special or customized meaning), and refers without limitation to oleaginous fatty acid constituents of vegetable matter, e.g., saturated fatty acids, monounsaturated fatty acids, polyunsaturated fatty acids, etc. The vegetable oil can be functionalized, e.g., alkoxylated, hydroxylated, aminated, etc. A functionalized vegetable oil is a derivative of a vegetable oil or other fatty substance, or a substance having a similar composition regardless of the origin of the substance. In some embodiments, the functionalized vegetable oil is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C=C moieties of the parent unsaturated fatty acid triglyceride is replaced with an epoxide moiety (i.e. a three-membered ring containing an oxygen). If the parent unsaturated fatty acid triglyceride has more than one C=C moiety, one, part, or all of the C=C moieties may be replaced by epoxide moieties. When the term "vegetable oil" is used herein, it is understood to include animal fats, or oils of synthetic origin, having a same chemical structure as a vegetable oil. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, or the like.

As used herein, the abbreviations for any compound, is, unless indicated otherwise, in accord with its common usage, recognized abbreviations, or the IUPAC-IUB Commission on Biochemical Nomenclature (See, Biochem. 11:942-944 (1972)).

Any percentages, ratios or other quantities referred to herein are on a weight basis, as a percentage of total weight, unless otherwise indicated. Any ranges disclosed herein includes minimum, maximum, and any points in between the minimum and maximum within said range.

The cyclic systems referred to herein include fused ring, bridged ring, and spiro ring moieties, in addition to isolated monocyclic moieties.

In a certain example embodiment of the disclosure the concentrate form of the solubilizing composition for a fertilizer compound and/or fertilizer composition in an aqueous based first solvent, the solubilizing composition comprises a first anionic surfactant and a first humectant.

The first anionic surfactant may comprise an aryl or alkyl sulfonic acid, or a derivative thereof. Typically, the first anionic maybe an alkyl sulfonic acid it may be a ($C_{10}$-$C_{18}$) alkyl benzenesulfonic acid or derivative thereof, wherein the alkyl group may be linear or branched, saturated or unsaturated, modified or unmodified. Preferably, in a certain preferred embodiment of this disclosure the first anionic surfactant may be a linear dodecyl benzenesulfonic acid. Preferably, the first anionic surfactant is present in an amount of between about 0.1 wt. % to about 30 wt. %, preferably in an amount of between about 0.1 wt. % to about 20 wt. %, further preferably in an amount of between about 0.1 wt. % to about 15 wt. %, and most preferably in an amount of about 2 wt. % to about 12 wt. %. of the concentrate form of the solubilizing composition.

The first humectant may be selected from, but not limited to, the group comprising: propylene glycol, polypropylene glycol, glycerol, sorbitol, mannitol, dulcitol, or polyols thereof, and wherein the humectant present in an amount of between about 30 wt. % to about 55 wt. % of the concentrate form of the solubilizing composition.

The solubilizing composition may include a second humectant, the second humectant may be selected from, but not limited to, the group comprising: alkyl glycoside, alkyl glucoside, straight chain ($C_4$-$C_{18}$) alkyl(poly)glycoside, branched chain ($C_4$-$C_{18}$) alkyl(poly)glycoside, straight chain ($C_4$-$C_{18}$) alkyl(poly)glucoside, branched chain ($C_4$-$C_{18}$) alkyl(poly)glucoside, and/or derivatives thereof, and wherein the humectant present in an amount of between about 15 wt. % to about 35 wt. % of the concentrate form of the solubilizing composition.

The solubilizing composition typically further includes a second solvent which may be water, and wherein the second solvent may be present in an amount of between about 5 wt. % to about 70 wt. %, preferably between about 10 wt. % to about 60 wt. %, further preferably between about 15 wt. % to about 50 wt. % of the concentrate form of the solubilizing composition. The first and second solvent may be the same, alternatively, may be different, preferably the first and second solvent are different.

The solubilizing composition typically further includes a pH adjusting means which may be a base, preferably sodium hydroxide, and wherein the base may be present in an amount of between about 0.1 wt. % to about 10 wt. %, preferably between about 0.5 wt. % to about 5 wt. %, further preferably between about 1 wt. % to about 3 wt. % of the concentrate form of the solubilizing composition.

The solubilizing composition typically further includes a preservative which may be an isothiazolinone based compound or composition, and wherein the preservative may be present in an amount of between about 0.05 wt. % to about 5 wt. %, preferably between about 0.08 wt. % to about 2 wt. %, further preferably between about 0.1 wt. % to about 1 wt. % of the concentrate form of the solubilizing composition.

The solubilizing composition typically further includes an antifoam which may be an organo-modified siloxane based compound or composition, and wherein the antifoam may be present in an amount of between about 0.05 wt. % to about 5 wt. %, preferably between about 0.08 wt. % to about 2 wt. %, further preferably between about 0.1 wt. % to about 1 wt. % of the concentrate form of the solubilizing composition.

The example embodiment may further comprise at least one second anionic surfactant may be sodium lauryl ether sulfate (SLES) or derivatives thereof present in an amount of between about 1 wt. % to about 20 wt. %, preferably between about 2 wt. % to about 10 wt. %, further preferably between about 3 wt. % to about 6 wt. % of the concentrate form of the solubilizing composition.

In a certain example embodiment of the disclosure the concentrate form of the solubilizing composition comprises:
- a first anionic surfactant comprising a ($C_{10}$-$C_{18}$) alkyl benzenesulfonic acid or derivative thereof, present in an amount of between about 2 wt. % to about 12 wt. %. of the concentrate form of the solubilizing composition;
- a humectant selected from the group consisting of: propylene glycol, polypropylene glycol, glycerol, sorbitol, mannitol, dulcitol, or polyols thereof, present in an amount of between about 30 wt. % to about 55 wt. % of the concentrate form of the solubilizing composition;
- a second humectant selected from the group consisting of: alkyl glycoside, alkyl glucoside, straight chain ($C_4$-$C_{18}$) alkyl(poly)glycosides, branched chain ($C_4$-$C_{18}$) alkyl(poly)glycosides, straight chain ($C_4$-$C_{18}$) alkyl (poly)glucosides, branched chain ($C_4$-$C_{18}$) alkyl(poly) glucosides, and/or derivatives thereof, and wherein the humectant present in an amount of between about 15 wt. % to about 35 wt. % of the concentrate form of the solubilizing composition;
- a solvent which is water, and wherein water present in an amount of between about 15 wt. % to about 50 wt. % of the concentrate form of the solubilizing composition;
- a pH adjusting means which is a base, preferably sodium hydroxide, and wherein the base present in an amount of between about 1 wt. % to about 3 wt. % of the concentrate form of the solubilizing composition;
- a preservative which is an isothiazolinone based compound or composition, and present in an amount between about 0.1 wt. % to about 1 wt. % of the concentrate form of the solubilizing composition; and
- an antifoam which is an organo-modified siloxane based compound or composition, and present in an amount of between about 0.1 wt. % to about 1 wt. % of the concentrate form of the solubilizing composition.

The example embodiment may further comprise a second anionic surfactant may be sodium lauryl ether sulfate (SLES) or derivatives thereof and may be present in an amount of between about 3 wt. % to about 6 wt. % of the concentrate form of the solubilizing composition.

Additionally and/or alternatively, the concentrate form of the solubilizing composition diluted to form the diluted form and applied to crops concomitantly provides anionic surfactant to the crops and aids the retention of water and/or aids the uptake of fertilizer by the crop.

TABLE 1.1 shows an example embodiment of the solubilizing composition according to a certain embodiment of the disclosure (formulation code ORO-298)

| Item | Description | Compound | Weight of Total (%) |
|---|---|---|---|
| 1 | First anionic surfactant derivative thereof | aryl or alkyl sulfonic acid, and/or a derivative thereof, preferably ($C_{10}$-$C_{18}$) alkyl benzenesulfonic acid | 0.1-15.0 (preferably 2.0-12.0) |
| 2 | First Humectant | glycerol or alkyl ethers thereof, propylene glycol, polypropylene glycol or alkyl ethers thereof, sorbitol, mannitol, dulcitol and/or polyols, straight chain ($C_4$-$C_{18}$) alkyl(poly)glycosides, branched chain ($C_4$-$C_{18}$) alkyl(poly)glycosides, straight chain ($C_4$-$C_{18}$) | 25.0-60.0 (preferably 30.0-55) |

TABLE 1.1-continued shows an example embodiment of the solubilizing composition according to a certain embodiment of the disclosure (formulation code ORO-298)

| Item | Description | Compound | Weight of Total (%) |
|---|---|---|---|
| 3 | Second Humectant | alkyl(poly)glucosides, branched chain ($C_4$-$C_{18}$) alkyl(poly)glucosides, and/or derivatives thereof glycerine (crude) Alkyl(poly)glycoside | 10.0-50.0 (preferably 15.0-35.0) |
| 4 | Solvent | Water | 10.0-60.0 (preferably 15-50) |
| Total: | | | 100 |

TABLE 1.2 shows an example embodiment of the solubilizing composition according to a certain preferred embodiment of the disclosure (formulation code ORO-298)

| Item | Description | Compound | Weight of Total (%) |
|---|---|---|---|
| 1 | First anionic surfactant derivative thereof | ($C_{10}$-$C_{18}$) alkyl benzenesulfonic acid | 2.0-12.0 |
| 2 | First Humectant | glycerine (crude) | 30.0-55.0 |
| 3 | Second Humectant | Alkyl(poly)glycoside | 15.0-35.0 |
| 4 | Solvent | Water | 10.0-50.0 |
| 5 | Second anionic surfactant | Sodium laureth ether sulfate (SLES) | 0.0-6.0 |
| 6 | Nonionic surfactant | Alcohol ethoxylated, polyoxyethylene Sorbitan monolaurate | 0.0-5.0 |
| 7 | Other additives | Preservatives, clarifiers, anti-freezing agents, hydrotropes, stabilizers, antioxidants, acidifiers (acid pH adjusters), neutralizers (base or acid pH adjusters), chelates, complexing agents, dyes, rheology modifiers, antifoams, anti-drift, organic solvents, oils | 0.01-10.0 |
| Total: | | | 100 |

The concentrate form of the solubilizing composition may be diluted in a tank mix or irrigation system and mixed an aqueous fertilizer and/or other chemistries at a rate of 1:5000 to 1:10, such that in use inside the tank mix the solubilizing composition facilitates the fertilizer to remain in solution and prevents components of the fertilizer to precipitate out of solution, therein aiding the application and/or fertigation of the aqueous fertilizer to crops via in-furrow application, side-dress application, top-dress application, band application, seedling placement application.

The other chemistries may include, but not limited to, the group comprising: insecticides, fungicides, acaricides, nutrients, miticides, bactericides, biocides, ovicides, nematicides, insect growth regulators, plant grow regulators, and biostimulants.

Additionally and/or alternatively, the concentrate form of the solubilizing composition diluted to form the diluted form and applied to crops concomitantly provides anionic surfactant to the crops and aids the retention of water and/or aids the uptake of fertilizer by the crop.

EXAMPLES

The examples here below are not to be considered as limiting to the disclosure. The broad disclosures made in the Summary and Detailed Description herein above are repeated by way of reference. The Applicant envisages conducting further experimental protocols regarding the liquid anti-pathogenic agricultural composition described herein and its use.

Examples of Products According the Present Invention

Method of Preparation of the Solubilizing Composition Liquid Concentrate

For the purpose of illustration, the method for preparing the solubilizing composition as used in the non-limiting examples includes the steps of admixing into a vessel a first humectant such as glycerol from between about 30 wt. % and 60 wt. %, preferably between about 30.0 to about 50.0 wt. %, then adding a solvent such as water from between about 15 wt. % and 50 wt. %, preferably 15 wt. % to about 25 wt. %, then adding an anionic surfactant such as a linear dodecyl benzenesulfonic acid from between about 0.1 wt. % and 30 wt. %, preferably between about 2.0 to about 10.0 wt. %, then adding a pH adjusting such as a base, preferably sodium hydroxide from between about 0.1 wt. % and 10 wt. %, preferably between about 1 wt. % to about 3 wt. %, then adding a second humectant such as an alkyl(poly)glycoside from between about 5 wt. % and 55 wt. %, preferably 15 wt. % to about 35 wt. %, then adding a preservative such as an isothiazolinone based compound, preferably between about 0.05 wt. % to about 5 wt. %, preferably between about 0.1 wt. % to about 1.0 wt. %, then adding an antifoam such as an organo-modified siloxane based compound, preferably between about 0.05 wt. % to about 5 wt. %, preferably between 0.1 wt. % to 1.0 wt. %. The method to prepare includes the steps of stirring the mixture into a clean vessel until a complete dissolution. In a typical example embodiment, and to obviate doubt, the following were admixed and stirred with between 45 g and 60 g of glycerol, water between 15 g and 30 g, one or more anionic surfactants such a linear dodecylbenzene sulfonic acid from 2.0 g to 10.0 g, a pH adjusting such as a base, preferably sodium hydroxide from between about between 1 wt. % to 3 wt. %, a second humectant from the group of an alkyl(poly)glycoside is from 15 g to 35 g, a preservative such as an isothiazolinone based compound, between from 0.1 wt. % to 1.0 wt. %, an antifoam such as an organo-modified siloxane based compound, preferably from between 0.1 wt. % to 1.0 wt. %. Heating is not necessarily required but may advantageously be employed depending on the physical state and characteristics of each compound during dissociation or emulsifying process. Other additives can be used for specific purposes, such as clarifiers, anti-foaming agents, anti-freezing agents, hydrotropes, UV stabilizers, colorants, nutrients, amino-acids, sea extract, anti-drift agents, oils and even water or other solvent, and/or other additives as are typically employed in adjuvant compositions. This method of preparation described above provides a concentrate form of the chemical activator according to the first aspect of this disclosure.

Preparing the Solubilizing Compositions

Three different liquid solubilizing compositions were prepared according to some of the embodiments. The solubilizing compositions concentrates are indicated by ORO-298-B, ORO-298-C and ORO-298-D. The details of the specific embodiments of each are described in Table 2. The Applicant envisages preparing and testing further embodiments according to this disclosure (in a laboratory and field environment). Various components were employed in the different formulations, including: dodecylbenzene sulfonic acid—anionic surfactant; crude glycerin (glycerol) —humectant; sodium hydroxide 50% solution—base; benzoisothiazolinone 20% solution—preservative; alcohol ethoxylated, POE-6—nonionic surfactant; sodium salt of lauryl ether sulfate—anionic surfactant; polyoxyethylene sorbitan monolaurate—nonionic surfactant; decyl glucoside—humectant; propylene glycol—humectant; organo-modified siloxane 20% emulsion defoamer—antifoam; industrial water—solvent.

TABLE 2.1

Solubilizing composition made according the present disclosure (formulation code ORO-298)—including possible ranges

| Compound | Amount (wt. %) or measured in grams |
|---|---|
| water (solvent) | 5.0-30.0 |
| propylene glycol, polypropylene glycol, glycerol, sorbitol, mannitol, dulcitol, or polyols , preferably glycerol ($1^{st}$ humectant) | 30.0-55.00 |
| aryl or alkyl sulfonic acid, and/or a derivative thereof, preferably (C10-C18) alkyl benzenesulfonic acid (anionic surfactant) | 2.0-15.0 |
| Base pH adjuster such as hydroxide, preferably sodium hydroxide (pH adjuster) | 0-10.0 |
| alkyl glycoside, alkyl glucoside, straight chain (C4-C18) alkyl(poly)glycoside, branched chain (C4-C18) alkyl(poly)glycoside, straight chain (C4-C18) alkyl(poly)glucoside, branched chain (C4-C18) alkyl(poly)glucoside, and/or derivatives thereof, preferably decyl glycoside ($2^{nd}$ humectant) | 0-30.0 |
| ammonium lauryl sulfate, sodium lauryl sarcosinate, sodium myreth sulfate, sodium pareth sulfate, sodium stearate, α-olefin sulfonate, and sodium lauryl ether sulfate (SLES) or derivatives thereof, (C6-C18) alkyl benzene sulfonic acid salts, sodium dodecylbenzene sulfonate, amine (C6-C18) alkyl benzene sulfonate, triethanolamine dodecylbenzene sulfonates, (C6-C18) alkyl ether sulfates, (C6-C18) | 0-6.0 |

TABLE 2.1-continued

Solubilizing composition made according the present disclosure
(formulation code ORO-298)—including possible ranges

| Compound | Amount (wt. %) or measured in grams |
|---|---|
| alkyl ethoxylated ether sulfates, (C6-C18) alkyl sulfates, lauryl ether polyethoxylated sodium sulfate, (C6-C18) alkyl phosphate esters, (C6-C18) alkoxylated sulfates, (C6-C18) alkoxylated phosphate esters, xylene sulfonate salts, cumene sulfonate salts, lignosulfonates, lignosulfonates salts, lignosulfonic acid sulfomethylated sodium, calcium, magnesium or potassium salts, sarcosines and sarcosinates salts, succinates salts, sulfosuccinates salts, tall oil fatty acids salts, alkyl fatty acids salts, vegetable oil fatty acid salts, lanolin fatty acid salts and combinations thereof, preferably lauryl ether sodium sulfate ($2^{nd}$ anionic surfactant) | |
| natural and/or synthetic (C8-C22) alkoxylated fatty alcohols, (C8-C22) ethoxylated fatty alcohols, alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof, preferably polyoxyethylene sorbitan monolaurate ($1^{st}$ nonionic surfactant) | 0-10.0 |
| natural and/or synthetic (C8-C22) alkoxylated fatty alcohols, (C8-C22) ethoxylated fatty alcohols, alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof, preferably alcohol ethoxylated 6EO ($2^{nd}$ nonionic surfactant) | 0-10.0 |
| natural or synthetic oil, may be a terpene or terpene containing natural oil, may be a natural oil modified by esterification or transesterification, such as an alkyl fatty acid ester, e.g., methyl esters, ethyl esters, propyl esters, butyl esters, 2-ethylhexyl esters or dodecyl esters, and is preferably a fatty acid, such as (C10-C22) fatty acid esters, such as from vegetables oils, preferably oil-yielding plants species such as citrus, soybean, corn, sunflower, rapeseed oil, cottonseed oil, linseed oil, palm oil, safflower, coconut oil, castor oil, olive oil, canola oil among others pure or mixed with an essential or edible oil extracted from a variety of plants or parts of plants such as trees, shrubs, leaves, flowers, grasses, fluids, herbs, fruits and seeds, or mixed with each other that are combined with one or more oils, preferably cold pressed orange oil (oil additive and/or organic solvent) | 0-5.0 |
| Other additives such as: Preservatives, clarifiers, anti-freezing agents, hydrotropes, stabilizers, antioxidants, acidifiers (acid pH adjusters), neutralizers (base or acid pH adjusters), chelates, complexing agents, dyes, rheology modifiers, antifoams, anti-drift, organic solvents, oils | 0-5.0 |
| TOTAL | 100.00 |
| FORMULATION TYPES | Soluble liquid (SL) or Microemulsion (ME) |

TABLE 2.2

Preferred embodiments of solubilizing composition made according the present disclosure (formulation code ORO-298)

| Compound | ORO-298-B | ORO-298-C | ORO-298-D |
|---|---|---|---|
| | Amount (wt. %) (or measured in grams) | | |
| Water (solvent) | 20.7 | 20.0 | 15.70 |
| Crude Glycerin ($1^{st}$ humectant) | 40.0 | 44.0 | 48.0 |
| Dodecylbenzene sulfonic acid ($1^{st}$ anionic surfactant) | 9.60 | 6.00 | 10.00 |
| Sodium Hydroxide 50% solution (pH adjuster) | 2.40 | 1.70 | 2.50 |
| Decyl glycoside ($2^{nd}$ humectant) | 20.0 | 18.00 | 17.80 |
| Sodium lauryl ether sulfate ($2^{nd}$ anionic surfactant) | — | 5.00 | 4.00 |
| Polyoxyethylene sorbitan monolaurate ($1^{st}$ nonionic surfactant) | 4.00 | — | — |
| Alcohol Ethoxylated 6EO ($2^{nd}$ nonionic surfactant) | — | 3.30 | — |

TABLE 2.2-continued

Preferred embodiments of solubilizing composition made according the present disclosure (formulation code ORO-298)

| | Compound | | |
|---|---|---|---|
| | ORO-298-B | ORO-298-C | ORO-298-D |
| | Amount (wt. %) (or measured in grams) | | |
| Cold Pressed Orange Oil (oil additive and/or organic solvent additive) | 1.30 | — | — |
| Other additives | 2.00 | 2.00 | 2.00 |
| TOTAL | 100.00 | 100.00 | 100.00 |
| FORMULATION TYPE | Microemulsion | Soluble liquid | Soluble liquid |

Physico-Chemical and Accelerated Stability Tests

Samples of products of certain embodiments were analyzed to determine their physical chemical characteristics and their behavior when diluted in water—pH, solubility; and into the pure solubilizing composition: pH, solubility, viscosity, surface tension, stability described on CIPAC Handbook F—Collaborative International Pesticide Analytical Ltd, 1994, reprint in 2007, the contents of which are hereby incorporated by reference in their entirety. It was analyzed and confirmed that solubilizing compositions prepared according to the embodiments exhibited stability in accelerated storage stability testing, and all samples were stable even in room temperature, cold (14 days @ 0° C.) or hot conditions (14 days @ 54° C.). The Applicant envisages conducting further comparison testing.

TABLE 3

Physical and chemical and accelerated stability tests results for solubilizing compositions according to the present disclosure

| ANALYSIS | ORO-298-B (solubilizing agent) | ORO-298-C (solubilizing agent) | ORO-298-D (solubilizing agent) |
|---|---|---|---|
| Appearance (product) | Clear brown liquid | Clear brown liquid | Clear brown liquid |
| Density @ 20° C. | 1.169 | 1.160 | 1.172 |
| pH (product) | 6.64 | 6.82 | 6.56 |
| PH (1% v/v) | 6.80 | 6.94 | 6.90 |
| Viscosity @ 25° C. | 215 Cp | 120 Cp | 150 Cp |
| Surface tension @ | 37.8 dyne/cm | 37.4 dyne/cm | 37.6 dyne/cm |
| Appearance (solution at 1.0%—distilled | Clear | Clear | Clear |
| Accelerated Storage Method CIPAC MT 46 (14 days at 0° C., 20° C. and 54° C.) | Stable | Stable | Stable |

Field Trial and Lab Trials—Solubility and Miscibility Evaluation Methodology

Lab trials were conducted using over 25 fertilizers concentrate formulations available on the market to stablish and finally to prove that the compositions and its possible mixtures are stable during at least 30 days when the product made according the present invention is added.

Solubility and Miscibility test—Into a closed cap test tube was mixed 10 parts of OR-298—(many versions including B, C and D) to 90 parts of a desired fertilizer concentrate formulation, inventing during one minute to a complete homogenizing, and keep static in a rack for test tubes. The evaluation was done at least 24 hours from the time of initial mixture and the test were conducted during at least 30 days in a room temperature evaluating presence of crystals, turbidity, cloud separation, phase separation, salt depositions.

Solubility and Miscibility test results—(A) The following liquid fertilizer concentrate formulations were tested and all mixtures are stable when mixed with the solubilizing compositions made according the present disclosure: N-Phuric 15/49, Sytasis 7-21-0, Ammonium Phosphate 10-34-0, Starter 8-24-6, True Bio 0.5-0-1, UAN 32 32-0-0, Liquid Urea 40-0-0, Ferti-Clear 5-5-5, Potassium Thiosulfate 0-0-25, Ammonium Thiosulfate 12-0-0, Ferti Drip 0-0-25, K-Phite 0-30-20, Zinc Chelate 6.5% 8-0-0, Monarch 2-20-15, Zinc sulfate 12% 0-0-0, Formation proprietary, Esp 1-0-8, Micro 500 (B, Cu, Fe, Mn, Zn), KTS Zinc chelate 9.5% True bio blend 0.8-2.6-18.2, KTS True bio blend Golden bio blend 0.1-0-18.1, Haifa Almond blend 2,6-0-8, KTS UN-32 1-0-15, Abha Humic 5-12-12, Calcium Thiosufate, Calcium ammonium nitrate, Soil-cal. ORO-298-B, ORO-298-C and ORO-298-D were all tested against the above liquid fertilizers for solubility and miscibility. All examples of formulations of this disclosure namely, ORO-298-B, ORO-298-C and ORO-298-D showed solubility and miscibility with the above liquid fertilizers. Some of the test results are showed in FIGS. 1 and 2.

Solubility and Miscibility test results—(B) As a comparison, the following fertilizer compositions were mixed with an anionic adjuvant based on 20% of sodium dodecylbenzene sulfonate tested at 10% and 90% each fertilizer: N-Phuric 15/49, Potassium Thiosulfate 0-0-25, Zinc sulfate 12% 0-0-0, K-Phite 0-30-20, NP 10-34-0, and Ammonium Thiosulfate 12-0-0. Anionic surfactant based on sodium dodecylbenzene sulfonate showed incompatibility or jellification effect and phase separation with the tested liquid fertilizers. The test result is showed in FIG. 3.

Solubility and Miscibility test results—(C) As a comparison, the following fertilizer compositions were mixed with a non-ionic adjuvant based on 20% of alcohol ethoxylated tested at 10% and 90% each fertilizer: N-Phuric 15/49, Potassium Thiosulfate 0-0-25, Zinc sulfate 12% 0-0-0, K-Phite 0-30-20, NP 10-34-0, and Ammonium Thiosulfate 12-0-0. Non-ionic surfactant based on alcohol ethoxylated showed incompatibility and clearly phase separation with the liquid fertilizers Potassium Thiosulfate 0-0-25, Zinc sulfate 12% 0-0-0, K-Phite 0-30-20, NP 10-34-0, and Ammonium Thiosulfate 12-0-0, only with N-Phuric 15/49 the tested non-ionic adjuvant showed some compatibility. The test result is showed in FIG. 4.

FIG. 1 (A to F) shows solubility and miscibility of fertilizers with ORO-298-D wherein FIG. 1A shows 90% fertilizer (N-Phuric) and 10% ORO-298-D; FIG. 1B shows 90% fertilizer (potassium thiosulfate) and 10% ORO-298-D; FIG. 1C shows 90% fertilizer (zinc sulfate) and 10% ORO-298-D; FIG. 1D shows 90% fertilizer (K-Phite) and 10% ORO-298-D; and FIG. 1E shows 90% fertilizer (10-34-0) and 10% ORO-298-D; and FIG. 1F shows 90% fertilizer (ammonium thiosulfate) and 10% ORO-298-D.

FIG. 2 (A to E) shows ORO-298-D at different concentrations of ORO-298-D together with liquid ammoniated phosphate (10-34-0) wherein FIG. 2A shows 10% ORO-298-D with 90% 10-34-0; FIG. 2B shows 25% ORO-298-D with 75% 10-34-0; FIG. 2C shows 50% ORO-298-D and 50% 10-34-0; FIG. 2D shows 75% ORO-298-D with 25% 10-34-0; and FIG. 2E shows 90% ORO-298-D in 10% 10-34-0.

FIG. 3 (A to F) shows solubility and miscibility of fertilizers with non-ionic adjuvant based on 20% of alcohol ethoxylated wherein FIG. 3A shows 90% fertilizer (N-Phuric) and 10% non-ionic surfactant; FIG. 3B shows 90% fertilizer (potassium thiosulfate) and 10% non-ionic surfactant; FIG. 3C shows 90% fertilizer (zinc sulfate) and non-ionic surfactant; FIG. 3D shows 90% fertilizer (K-Phite) and 10% non-ionic surfactant; and FIG. 3E shows 90% fertilizer (10-34-0) and 10% non-ionic surfactant; and FIG. 3F shows 90% fertilizer (ammonium thiosulfate) and 10% non-ionic surfactant. This was surprising and unexpected given the problems faced in the prior art.

FIG. 4 (A to F) shows solubility and miscibility of fertilizers with anionic surfactant based on 20% of sodium dodecylbenzene sulfonate wherein FIG. 4A shows 90% fertilizer (N-Phuric) and 10% anionic surfactant; FIG. 4B shows 90% fertilizer (potassium thiosulfate) and 10% anionic surfactant; FIG. 4C shows 90% fertilizer (zinc sulfate) and 10% anionic surfactant; FIG. 4D shows 90% fertilizer (K-Phite) and 10% anionic surfactant; and FIG. 4E shows 90% fertilizer (10-34-0) and 10% anionic surfactant; and FIG. 4F shows 90% fertilizer (ammonium thiosulfate) and 10% anionic surfactant. This was surprising and unexpected given the problems faced in the prior art.

Field trials—Initial field trials as a screening of the formulations of this disclosure were conducted in a greenhouse. Three tests were conducted: a) Vigor of plants after 48 hours of germination (root evaluation—length and number or branches); b) Mass of wet roots after 15 days of germination; c) Mass of dry roots after 15 days of germination.

In all screening tests had conducted showed that using OR-298-D the improvement in root formation and root mass is superior comparing with the treatment using a single fertilizer concentrate. The subject of this disclosure herein described improves water penetration or water movement into soil. In turn, the compatibility of the fertilizers with the solubilizing composition according to this disclosure provides improved fertilizer (and nutrient, bio-stimulant, microbial and mineral) availability (particularly nitrogen, phosphorous and potassium) to a seed and/or plant which results in healthier crops and/or improved crop yield.

Other field trials and greenhouse trials were conducted to support this disclosure, considering statistical data and including a soil movement study.

Further field trials were conducted on corn and soybean, two very commercially relevant crop types, in an in-furrow

TABLE 4

Compatibility tests with various fertilizers showing non-compatibility with the commercially available nonionic surfactant based on alcohol ethoxylate 20%, and showing compatibility with the solubilizing composition according to this disclosure

| | Liquid Fertilizer | | | | | | |
|---|---|---|---|---|---|---|---|
| | Ammonium polyphosphate | Liquid starter | Potassium thiosulfate | Ammonium thiosulfate | Zinc sulfate | Potassium phosphite | Ferti Drip |
| N-P-K-S | 10-34-0 | 8-24-6 | 0-0-25-17 | 12-0-0-26 | (12) (5) | 0-31-23 | 0-0-25 |
| Agrochemical* | Nonionic (20% AE) | Nonionic (20% AE) | Nonionic (20% AE) | Nonionic (20% AE) | Nonionic (20% AE) | Nonionic (20% AE) | Nonionic (20% AE) |
| Agrochemical* rate (% v/v) | 10 | 10 | 10 | 10 | 10 | 10 | 10 |
| Compatible (Yes/No) | No | No | No | No | No | No | No |
| Observation (@60 minutes) | Severe agglomeration | Severe agglomeration | Severe agglomeration | Severe agglomeration | Severe agglomeration | Severe agglomeration | Severe agglomeration |
| Wet sieve (100 mesh) | Retention | Retention | Retention | Retention | Retention | Retention | Retention |
| Solubilizing composition | OR-298-D | OR-298-D | OR-298-D | OR-298-D | OR-298-D | OR-298-D | OR-298-D |
| Solubilizing composition rate (% v/v) | 10 | 10 | 10 | 10 | 10 | 10 | 10 |
| Compatible (Yes/No) | Yes | Yes | Yes | Yes | Yes | Yes | Yes |
| Observation (@60 minutes) | Homogeneous mixture | Homogeneous mixture | Homogeneous mixture | Homogeneous mixture | Homogeneous mixture | Homogeneous mixture | Homogeneous mixture |
| Wet sieve (100 mesh) | No retention | No retention | No retention | No retention | No retention | No retention | No retention |

*Agrochemical is a commercial soil conditioner based on 20% alcohol ethoxylate (AE) nonionic surfactant called Transformer ®.

The results in Table 4 shows that commercially available nonionic surfactants (based on alcohol ethoxylate) are not compatible with fertilizers (typically concentrated fertilizers). However, the solubilizing composition according to this disclosure shows compatibility. This provides for use of more effective anionic surfactants which are typically less expensive relative to nonionic surfactants and also provide better functionality in wetting soil that has been dried during a period of reduced or no precipitation). The compatibility allows a farmer to apply the concentrated fertilizers to the soil without gelation or blockage allowing less use of water, and facilitating less soil compaction from vehicles that would carry spray tanks through agricultural lands.

application of the solubilizing composition according to this disclosure together with fertilizer.

Soybean field study. Experimental design: Two-factor factorial in random complete block design (RCBD) with 5 blocks. Application method: In-furrow application with/without starter fertilizer 6-24-6 at 2.5 gal/a. Key findings: In-furrow application of the solubilizing composition according to this disclosure ORO-298 at 2-4 pints per acre with/without starter fertilizer significantly improved emergence, plant vigor, early root growth, and nutrient uptake of N, K, and P by soybean, when compared to the un-fertilized or fertilized control.

Figure 5B:
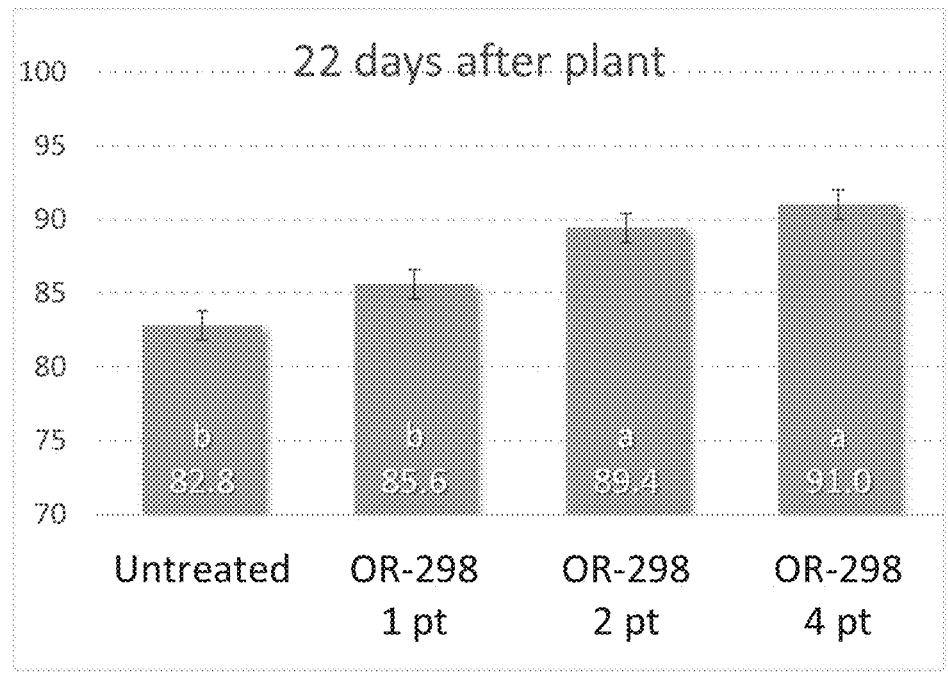
FIG. 5B show the effect of ORO-298 in furrow application on the germination of soybeans at 22 days after planting. All rates per acre. Error bars: Standard error ($p<0.05$). ORO-298 effects observed with or without fertilizer in furrow. 2.5 gal/ac using 6-24-6 fertilizer. In furrow treatment at seed. 5 gal/ac mixture volume. Soil: Milford silty clay loam. pH 6.8. Application of ORO-298 shows improved final germination.

FIG. 5A show the effect of ORO-298 in furrow application on the germination of soybeans at 15 days after planting. All rates as shown as per acre. Error bars: Standard error (p<0.05). ORO-298 effects observed with or without fertilizer in furrow. 2.5 gal/ac using 6-24-6 fertilizer. In furrow treatment at seed. 5 gal/ac mixture volume. Soil: Milford silty clay loam. pH 6.8. Application of ORO-298 shows improved early germination. FIG. 5b show the effect of ORO-298 in furrow application on the germination of soybeans at 22 days after planting. All rates per acre. Error bars: Standard error (p<0.05). ORO-298 effects observed with or without fertilizer in furrow. 2.5 gal/ac using 6-24-6 fertilizer. In furrow treatment at seed. 5 gal/ac mixture volume. Soil: Milford silty clay loam. pH 6.8. Application of ORO-298 shows improved final germination.

Figure 6:
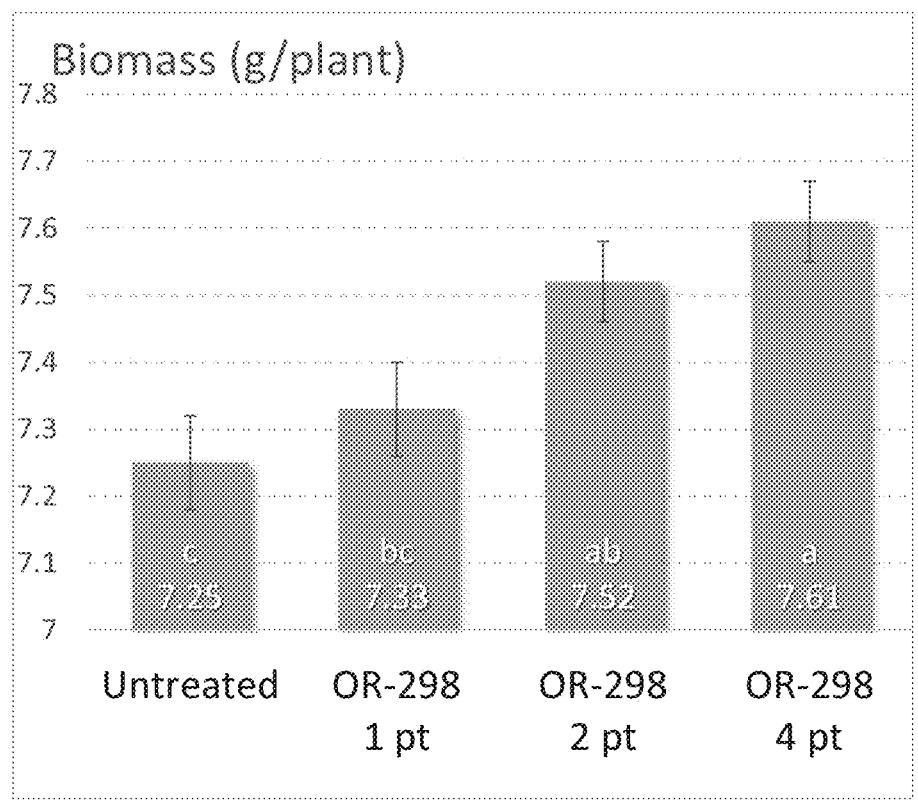
FIG. 6A shows the effect of ORO-298 in furrow application on seedling vigor (soybean), and shows whole plant biomass 30 days after germination.
FIG. 6B shows the effect of ORO-298 in furrow application on seedling vigor (soybean), and the number of root nodules per plant 30 days after germination.
Figure 6:
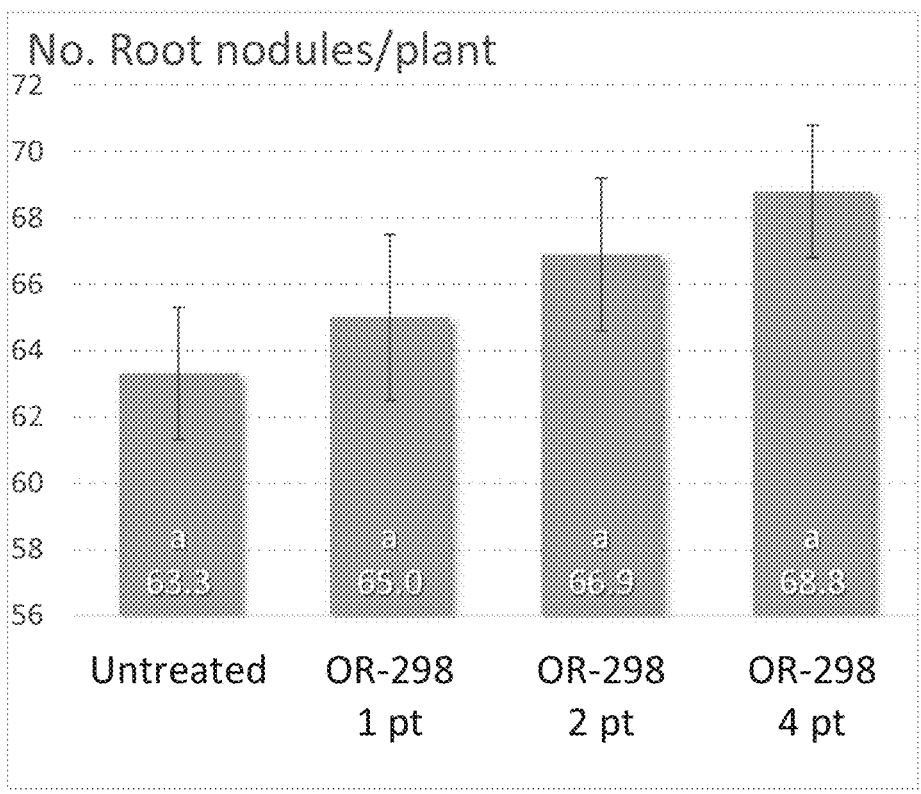

FIG. 6A shows the effect of ORO-298 in furrow application on seedling vigor (soybean), and shows whole plant biomass 30 days after germination. FIG. 6B shows the effect of ORO-298 in furrow application on seedling vigor (soybean), and the number of root nodules per plant 30 days after germination. Here it can be seen that ORO-298 significantly improves vigor in soybean.

Figure 7A:
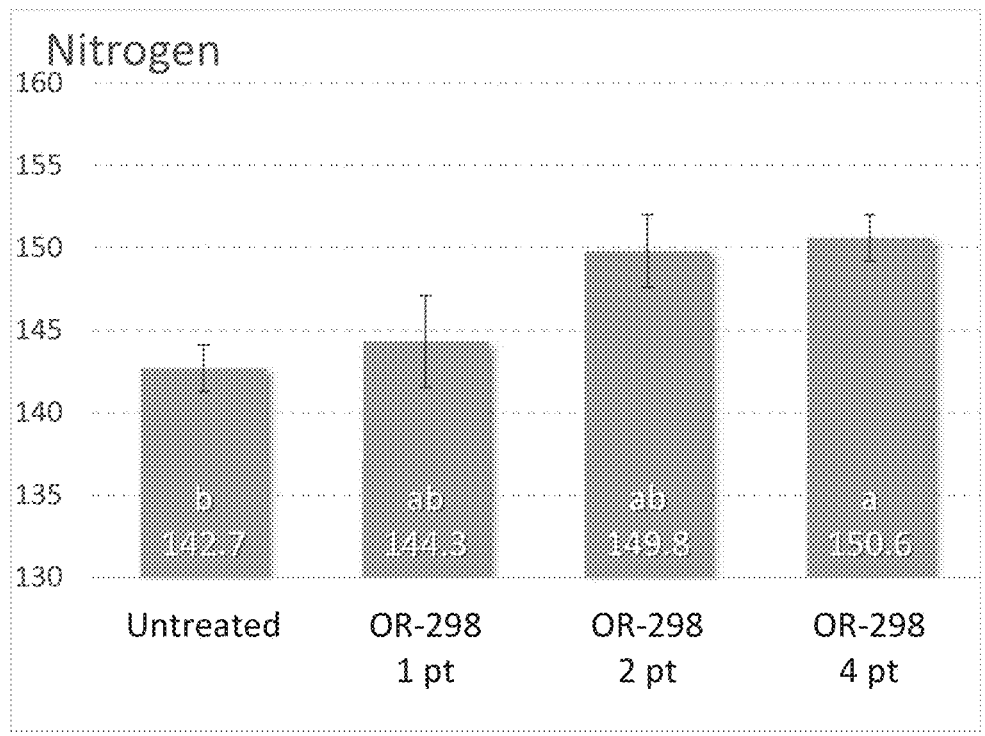
FIG. 7A shows the effect of ORO-298 in furrow application macro-nutrient uptake, specifically nitrogen in soybean.
Figure 7B:
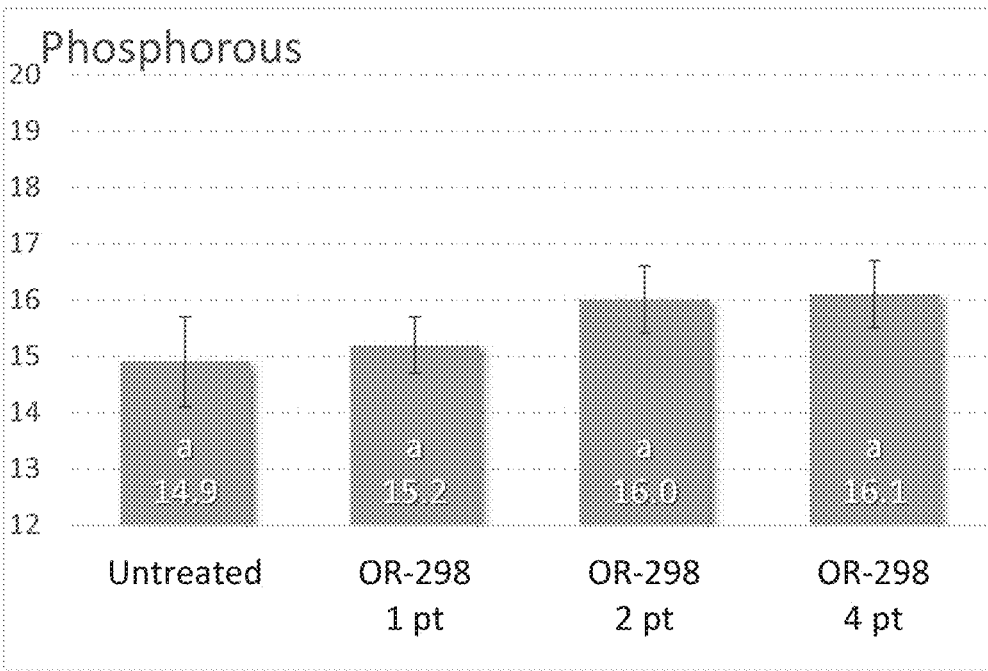
FIG. 7B shows the effect of ORO-298 in furrow application macro-nutrient uptake, specifically phosphorous in soybean.
Figure 7C:
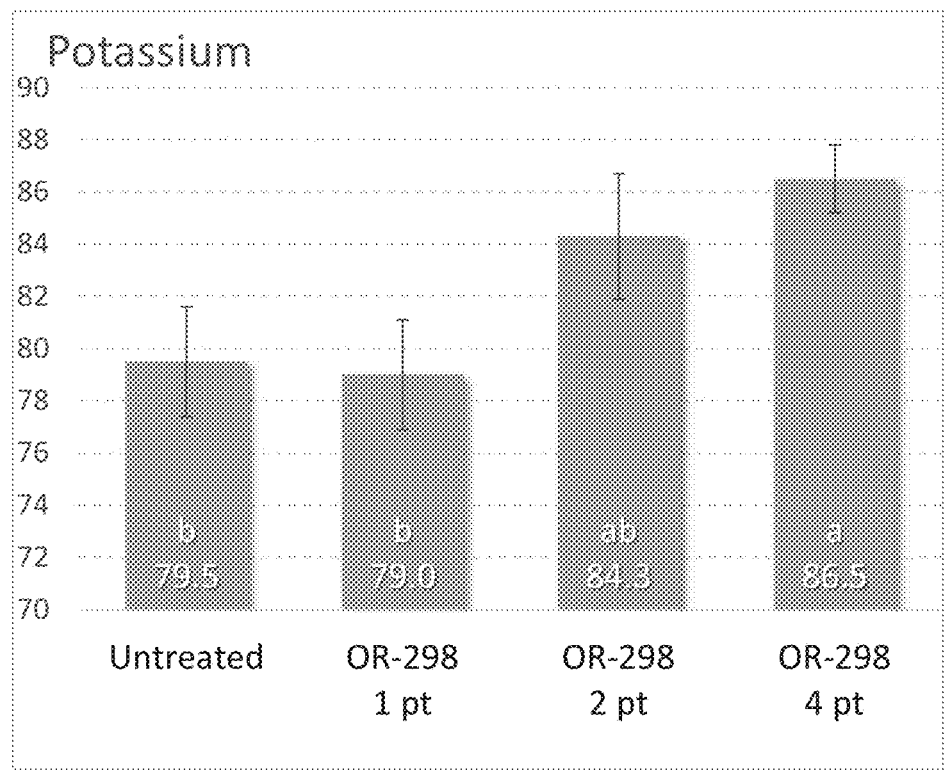
FIG. 7C shows the effect of ORO-298 in furrow application macro-nutrient uptake, specifically potassium in soybean.

FIGS. 7A, B and C shows the effect of ORO-298 in in-furrow application on macro-nutrient uptake of nitrogen, phosphorous and potassium, respectively, in soybean.

Figure 8:
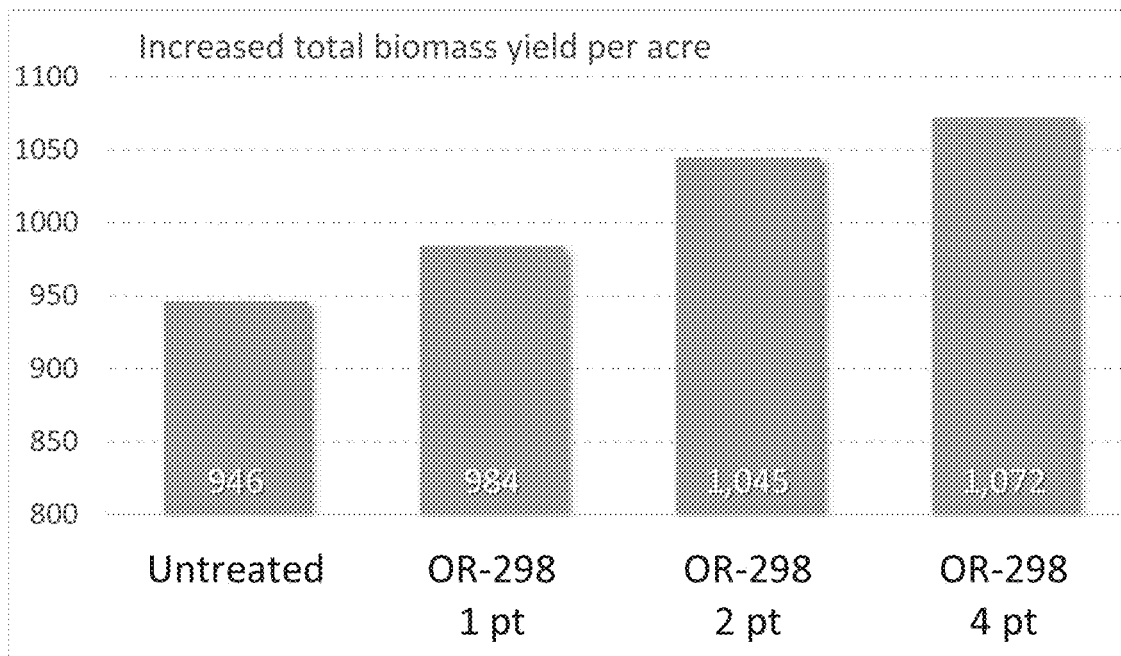
FIG. 8 shows the effect of ORO-298 in furrow application on biomass yield per acre for soybean. Calculated dry biomass produced (kg/acre).

FIG. 8 shows the effect of ORO-298 in in-furrow application on biomass yield per acre for soybean. Calculated dry biomass produced (kg/acre).

Importantly, in soybean (FIGS. 5 to 8), it is shown that in-furrow application of ORO-298 at 2-4 pints per acre with/without starter fertilizer 6-24-6 significantly improved emergence, plant vigor, early root growth, and nutrient uptake by soybean, when compared to the unfertilized or fertilized control.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the disclosure to the specific embodiments and examples described herein, but rather to also cover all modification and alternatives coming with the true scope and spirit of the disclosure.

What is claimed is:

1. A solubilizing composition for a fertilizer compound and/or fertilizer composition, the solubilizing composition including:
   a first anionic surfactant comprising a linear dodecylbenzenesulfonic acid and/or a derivative thereof, present in an amount of between 0.1 wt. % to 30 wt. %;
   at least one first humectant selected from the group consisting of glycerol, sorbitol, mannitol, and dulcitol, wherein the first humectant is present in an amount of between 5 wt. % to 65 wt. %;
   at least one second humectant selected from the group consisting of: alkyl glycoside, aryl glucoside, straight chain ($C_4$-$C_{18}$) alkyl (poly) glycosides, branched chain ($C_4$-$C_{18}$) alkyl (poly) glycosides, straight chain ($C_4$-$C_{18}$) alkyl (poly) glucosides, branched chain ($C_4$-$C_{18}$) alkyl (poly) glucosides, and derivatives thereof, wherein the second humectant is present in an amount of between 5 wt. % to 55 wt. %;
   water in an amount between 15 wt % to 50 wt %;
   an additive selected from the group consisting of preservatives, clarifiers, anti-freezing agents, hydrotropes, stabilizers, antioxidants, acid pH adjusters, base neutralizers, acid neutralizers, chelates, complexing agents, dyes, rheology modifiers, antifoams, anti-drift, organic solvents, oils, and combinations thereof, wherein the oils are not alkylated seed oils;
   at least one second anionic surfactant selected from the group consisting of sodium lauryl ether sulfate (SLES) and derivatives thereof, wherein the second anionic surfactant is present in an amount of between 3 wt. % to 6 wt. %;
   wherein the preservative is selected from the group consisting of: isothiazolinones derivatives, benzisothiazolinones (BIT), methylisothiazolinones (MIT), chloromethylisothiazolinones (CIT or CMIT), octylisothiazolinones (OIT), dichloro-octyl-isothiazolinones (DCOIT), 2-bromo-2-nitropropane-1,3-diol (Bronopol), dibromo-nitrilopropion Amide (DBNPA), imidazolinones, hydroxymethyl-dimethylimidazolidone-dione, formaldehydes, paraformaldehydes, formaldehydes donors, hydroxymethyl ureide formaldehydes donors, parabens, methylparaben, propylparaben, and combinations thereof;
   wherein the antifoam is selected from the group consisting of: organo-modified siloxane polymers, polyethersiloxane polymers, polyorganosiloxanes polymers, polydimethylsiloxanes polymers, fluorosilicones polymers, modified silicon based polymers, siloxanepolyoxyalkylene block copolymer, polyether functional silicon copolymers, polyester functional silicone copolymers, polyoxyalkylene-polysiloxane copolymers, polysiloxane-polyoxyethylene-polyoxypropylene triblock copolymers, and combinations thereof,
   wherein in a tank mix including a fertilizer compound and/or fertilizer composition, the solubilizing composition facilitates solubilizing the fertilizer compound and/or the fertilizer composition in the tank mix thereby facilitating application and/or fertigation to a crop.

2. The solubilizing composition of claim 1 further comprising a base selected from the group consisting of sodium hydroxide, potassium hydroxide and ammonium hydroxide.

3. The solubilizing composition of claim 1, wherein the oil is a citrus oil.

4. The solubilizing composition of claim 1, wherein the first anionic surfactant is present in an amount of between 2 wt. % to 12 wt. %.

5. The solubilizing composition of claim 1, wherein the first humectant is present in an amount of between 30 wt. % to 55 wt. %.

6. The solubilizing composition of claim 1, wherein the second humectant is present in an amount of between 15 wt. % to 35 wt. %.

7. A concentrate form of the solubilizing composition of claim 1 comprising:
   a first anionic surfactant comprising an aryl and/or alkyl sulfonic acid, or a derivative thereof, wherein the first anionic surfactant is a linear benzenesulfonic acid or derivative thereof, wherein the first anionic surfactant is present in an amount of between 2 wt. % to 12 wt. % of the concentrate form of the solubilizing composition;
   a first humectant selected from the group consisting of glycerol, sorbitol, mannitol, and dulcitol, and wherein the humectant is present in an amount of between 30 wt. % to 55 wt. % of the concentrate form of the solubilizing composition;
   a second humectant selected from the group consisting of: alkyl glycoside, aryl glucoside, straight chain ($C_4$-$C_{18}$) alkyl (poly) glycoside, branched chain ($C_4$-$C_{18}$) alkyl (poly) glycoside, straight chain ($C_4$-$C_{18}$) alkyl (poly) glucosides, branched chain ($C_4$-$C_{18}$) alkyl (poly) glucosides, and/or derivatives thereof, and wherein the humectant is present in an amount of 15 wt. % to 35 wt. % of the concentrate form of the solubilizing composition;
   water in an amount of between 15 wt. % to 50 wt. % of the concentrate form of the solubilizing composition;
   sodium hydroxide in an amount of between 1 wt. % to 3 wt. % of the concentrate form of the solubilizing composition;
   an isothiazolinone based compound or composition preservative, wherein the preservative is present in an amount of between 0.1 wt. % to 1 wt. % of the concentrate form of the solubilizing composition; and an organo-modified siloxane based compound or composition antifoam, wherein the antifoam is present in an amount of between 0.1 wt. % to 1 wt. % of the concentrate form of the solubilizing composition;

at least one second anionic surfactant selected from the group consisting of sodium lauryl ether sulfate (SLES) or derivatives thereof, wherein the second anionic surfactant is present in an amount of between 3 wt. % to 6 wt. % of the concentrate form of the solubilizing composition.

8. A concentrate form of a solubilizing composition comprising:
a first anionic surfactant comprising a linear dodecyl benzenesulfonic acid or derivative thereof, present in an amount of between 2 wt. % to 12 wt. % of the concentrate form of the solubilizing composition;
a first humectant selected from the group consisting of glycerol, sorbitol and dulcitol, and wherein the first humectant is present in an amount of between 30 wt. % to 55 wt. % of the concentrate form of the solubilizing composition;
a second humectant selected from the group consisting of: alkyl glycoside, aryl glucoside, straight chain ($C_4$-$C_{18}$) alkyl (poly) glycoside, branched chain ($C_4$-$C_{18}$) alkyl (poly) glycoside, straight chain ($C_4$-$C_{18}$) alkyl (poly) glucoside, branched chain ($C_4$-$C_{18}$) alkyl (poly) glucoside, and/or derivatives thereof, and wherein the humectant is present in an amount of between 15 wt. % to 35 wt. % of the concentrate form of the solubilizing composition;
water in an amount of between 15 wt. % to 50 wt. % of the concentrate form of the solubilizing composition;
sodium hydroxide in an amount of between 1 wt. % to 3 wt. % of the concentrate form of the solubilizing composition;
an isothiazolinone based preservative in an amount of between 0.1 wt. % to 1 wt. % of the concentrate form of the solubilizing composition; and
an organo-modified siloxane based antifoam in an amount of between about 0.1 wt. % to about 1 wt. % of the concentrate form of the solubilizing composition; and
sodium lauryl ether sulfate (SLES) or derivatives thereof in an amount of between 3 wt. % to 6 wt. % of the concentrate form of the solubilizing composition.

9. The concentrate form of a solubilizing composition of claim 8, wherein the linear dodecyl benzenesulfonic acid or derivative thereof is a linear (C10-C18) alkyl benzene sulfonic acid or derivative thereof.

10. The concentrate form of a solubilizing composition of claim 8, wherein the isothiazolinone based preservative is benzoisothiazolinone.

11. The concentrate form of a solubilizing composition of claim 8, wherein the organo-modified siloxane based antifoam is selected from the group consisting of an organo-modified silane polymer, a polyethersiloxane polymer, a polyorganosiloxane polymer, a polydimethylsiloxane polymer, siloxanepolyoxyalkylene block copolymer, a polyether functional silicon copolymer, a polyester functional silicone copolymer, a polyoxyalkylene-polysiloxane copolymer, a polysiloxane-polyoxyethylene-polyoxypropylene triblock copolymer and a silicon methacrylate compound.

12. A method of fertigation comprising adding a solubilizing composition into a tank mix including a fertilizer compound and/or fertilizing composition and fertigating a crop, seed, or plant via in-furrow application, side-dress application, top-dress application, band application, seedling placement application, wherein the solubilizing composition prevents coagulation and/or precipitation inside the tank mix and/or fertigation reticulation network while concomitantly allowing for the application of anionic surfactant to a dry soil, wherein the solubilizing composition includes:
a first anionic surfactant comprising a linear dodecylbenzene sulfonic acid or a derivative thereof;
at least one first humectant selected from the group consisting of glycerol, sorbitol, mannitol, and dulcitol,
at least one second humectant selected from the group consisting of alkyl glycoside, aryl glucoside, straight chain ($C_4$-$C_{18}$) alkyl (poly) glycosides, branched chain ($C_4$-$C_{18}$) alkyl (poly) glycosides, straight chain ($C_4$-$C_{18}$) alkyl (poly) glucosides, branched chain ($C_4$-$C_{18}$) alkyl (poly) glucosides, and derivatives thereof, and
water in an amount of between 15 wt. % to 50 wt. %;
an additive selected from the group consisting of: preservatives, clarifiers, hydrotropes, stabilizers, antioxidants, acid pH adjusters, neutralizers, acid neutralizers, base neutralizers, chelates, complexing agents, dyes, rheology modifiers, antifoams, anti-drift, oils, and combinations thereof, wherein the oils are not alkylated seed oils;
at least one second anionic surfactant selected from the group consisting of sodium lauryl ether sulfate (SLES) or derivatives thereof,
wherein in a tank mix including a fertilizer compound and/or fertilizer composition, the solubilizing composition facilitates solubilizing the fertilizer compound and/or the fertilizer composition in the tank mix therein facilitating application and/or fertigation to a crop.

13. The method of claim 12, wherein the linear dodecyl benzenesulfonic acid or derivative thereof is a linear (C10-C18) alkyl benzene sulfonic acid or derivative thereof.

14. The method of claim 12, wherein the oils are citrus oils.

15. A solubilizing composition for a fertilizer compound and/or fertilizer composition, the solubilizing composition consisting of:
a first anionic surfactant comprising dodecylbenzene sulfonic acid, and/or a derivative thereof;
at least one first humectant selected from the group consisting of glycerol, sorbitol, mannitol, and dulcitol,
at least one second humectant selected from the group consisting of: alkyl glycoside, aryl glucoside, straight chain ($C_4$-$C_{18}$) alkyl (poly) glycosides, branched chain ($C_4$-$C_{18}$) alkyl (poly) glycosides, straight chain ($C_4$-$C_{18}$) alkyl (poly) glucosides, branched chain ($C_4$-$C_{18}$) alkyl (poly) glucosides, and derivatives thereof,
water in an amount between 15 wt % to 50 wt %;
an additive selected from the group consisting of preservatives, clarifiers, hydrotropes, stabilizers, antioxidants, acid pH adjusters, base neutralizers, chelates, complexing agents, dyes, rheology modifiers, antifoams, anti-drift, oils, and combinations thereof, wherein the oils are not alkylated seed oils;
at least one second anionic surfactant selected from the group consisting of sodium lauryl ether sulfate (SLES) and derivatives thereof,
wherein the preservative is selected from the group consisting of: isothiazolinones derivatives, benzisothiazolinones (BIT), methylisothiazolinones (MIT), chloromethylisothiazolinones (CIT or CMIT), octylisothiazolinones (OIT), dichloro-octyl-isothiazolinones (DCOIT), 2-bromo-2-nitropropane-1,3-diol (Bronopol), dibromo-nitrilopropion Amide (DBNPA), imidazolinones, hydroxymethyl-dimethylimidazolidone-dione, formaldehydes, paraformaldehydes, formaldehydes donors, hydroxymethyl ureide formaldehydes donors, parabens, methylparaben, propylparaben, and combinations thereof;

wherein the antifoam is selected from the group consisting of: organo-modified siloxane polymers, polyethersiloxane polymers, polyorganosiloxanes polymers, polydimethylsiloxanes polymers, fluorosilicones polymers, modified silicon based polymers, siloxanepolyoxyalkylene block copolymer, polyether functional silicon copolymers, polyester functional silicone copolymers, polyoxyalkylene-polysiloxane copolymers, polysiloxane-polyoxyethylene-polyoxypropylene triblock copolymers, and combinations thereof, and wherein in a tank mix including a fertilizer compound and/or fertilizer composition, the solubilizing composition facilitates solubilizing the fertilizer compound and/or the fertilizer composition in the tank mix thereby facilitating application and/or fertigation to a crop.

16. The composition of claim 15, wherein the linear dodecyl benzenesulfonic acid or derivative thereof is a linear (C10-C18) alkyl benzene sulfonic acid or derivative thereof.

17. The composition of claim 15, wherein the oils are citrus oils.

* * * * *